（12）United States Patent
Barris et al.

(10) Patent No.: US 7,299,417 B1
(45) Date of Patent: Nov. 20, 2007

(54) SYSTEM OR METHOD FOR INTERACTING WITH A REPRESENTATION OF PHYSICAL SPACE

(76) Inventors: Joel M. Barris, 4528 Valleyview Dr., West Bloomfield, MI (US) 48323; Gabriel L. DeWitt, 134 Seaview Ave. #3, Santa Cruz, CA (US) 95062; Dhiren P. Dasu, 910 Hammon Gulch Ave., Boulder Creek, CA (US) 95006

( * ) Notice: Subject to any disclaimer, the term of this patent is extended or adjusted under 35 U.S.C. 154(b) by 916 days.

(21) Appl. No.: 10/630,061

(22) Filed: Jul. 30, 2003

(51) Int. Cl.
*G06F 3/00* (2006.01)
*G06F 3/14* (2006.01)

(52) U.S. Cl. .................. 715/719; 715/738; 715/765; 715/781

(58) Field of Classification Search ............... 715/716, 715/719, 733, 738, 764, 781, 786, 810, 835, 715/501.1, 765, 846; 345/649, 650, 655, 345/659, 660, 661, 666, 619
See application file for complete search history.

(56) References Cited

U.S. PATENT DOCUMENTS

| | | | |
|---|---|---|---|
| 6,040,841 A * | 3/2000 | Cohen et al. ............... 345/473 |
| 6,121,966 A * | 9/2000 | Teodosio et al. ........... 715/838 |
| 6,268,864 B1 * | 7/2001 | Chen et al. ................. 345/428 |
| 6,285,365 B1 * | 9/2001 | Nalwa ......................... 715/835 |
| 6,330,976 B1 * | 12/2001 | Dymetman et al. ......... 235/487 |
| 6,593,969 B1 * | 7/2003 | Discoll et al. .............. 348/335 |
| 6,987,520 B2 * | 1/2006 | Criminisi et al. ........... 345/629 |
| 7,082,572 B2 * | 7/2006 | Pea et al. .................... 715/720 |
| 7,096,428 B2 * | 8/2006 | Foote et al. ................. 715/721 |
| 7,120,197 B2 * | 10/2006 | Lin et al. ................ 375/240.29 |
| 7,167,840 B1 * | 1/2007 | Seidman et al. .............. 705/52 |
| 2003/0076822 A1 * | 4/2003 | Shalom et al. .............. 370/378 |
| 2004/0225968 A1 * | 11/2004 | Look et al. ................. 715/778 |

FOREIGN PATENT DOCUMENTS

WO          WO 97/42601          * 11/1997

OTHER PUBLICATIONS

Xiang Zhang et al, "Taking AR into Large Scale Industrial Environments: Navigation and Information Access with Mobile Computers", 2001, IEEE Comput. Soc., Los Alamitos, CA pp. 179-180.*

(Continued)

*Primary Examiner*—X. L. Bautista

(57) ABSTRACT

The interactive video system and method (collectively the "system") provides users with the ability to navigate and otherwise interact with a representation of physical space. Each representation can include a number of viewpoints and objects that can be selected by the user to provide interactive functionality. For example, a user can decide to examine the contents a bookshelf, tilt upwards to look at a chandelier, or zoom in on a tree visible from an exterior window. The motion of tilting, panning, or zooming is conveyed in the form of video clips that accurately resemble the way a human being would perceive such activities. The viewing of objects and viewpoints can be accompanied by the display of information relevant to the user. The various representations can be stored in highly compact files that allow even low-speed dial-up Internet users to effectively navigate a representation in a real-time manner.

3 Claims, 17 Drawing Sheets

OTHER PUBLICATIONS

Jim Mallory, "Hike the Rocky Mountains 'virtual reality' landscape", May 1994, Newsbytes, 1 page.*

Joe Stoddard, "Enhancing CAD", Jan. 2003, Builder v26, n1, pp. 369-370.*

M. P. Halio, "Helping users navigate in multimedia documents: the affective domain", 1992, ACM, p. 233-6.*

Samuel Greengard, "How technology is advancing HR", Sep. 1993, Personnel Journal, v72, n9, p. 80(9).*

Nelson Heerema et al, "Prediction, visualization, and auralization of noise in industrial workrooms during computer 'walk-through'", Mar. 1999, Inst. Noise Control Eng. v47, n2, p. 65-70.*

Jonathan Foote et al, "FlyCam: Practical Panoramic Video and Automatic Camera Control", Aug. 2000, IEEE, vol. III, p. 1419-1422.*

M. Nicolescu et al, "Segmentation, tracking and interpretation using panoramic video", 2000, IEEE, p. 169-174.*

Internet Pictures Corporation website located at www.ipix.com, 2003.

Imatronics Panarama Express website located at www.imatronics.com, 2003.

3D Vista Panoramic Virtual Tour and Streaming Media Software website located as www.3dvista.com/main.htm, 2004.

iSeeMedia website located at www.iseemedia.com, 2004.

VR Toolbox, Inc. website located at www.vrtoolbox.com/vrthome.html, 2003.

PixAround website located at www.pixaround.com, 2003.

* cited by examiner

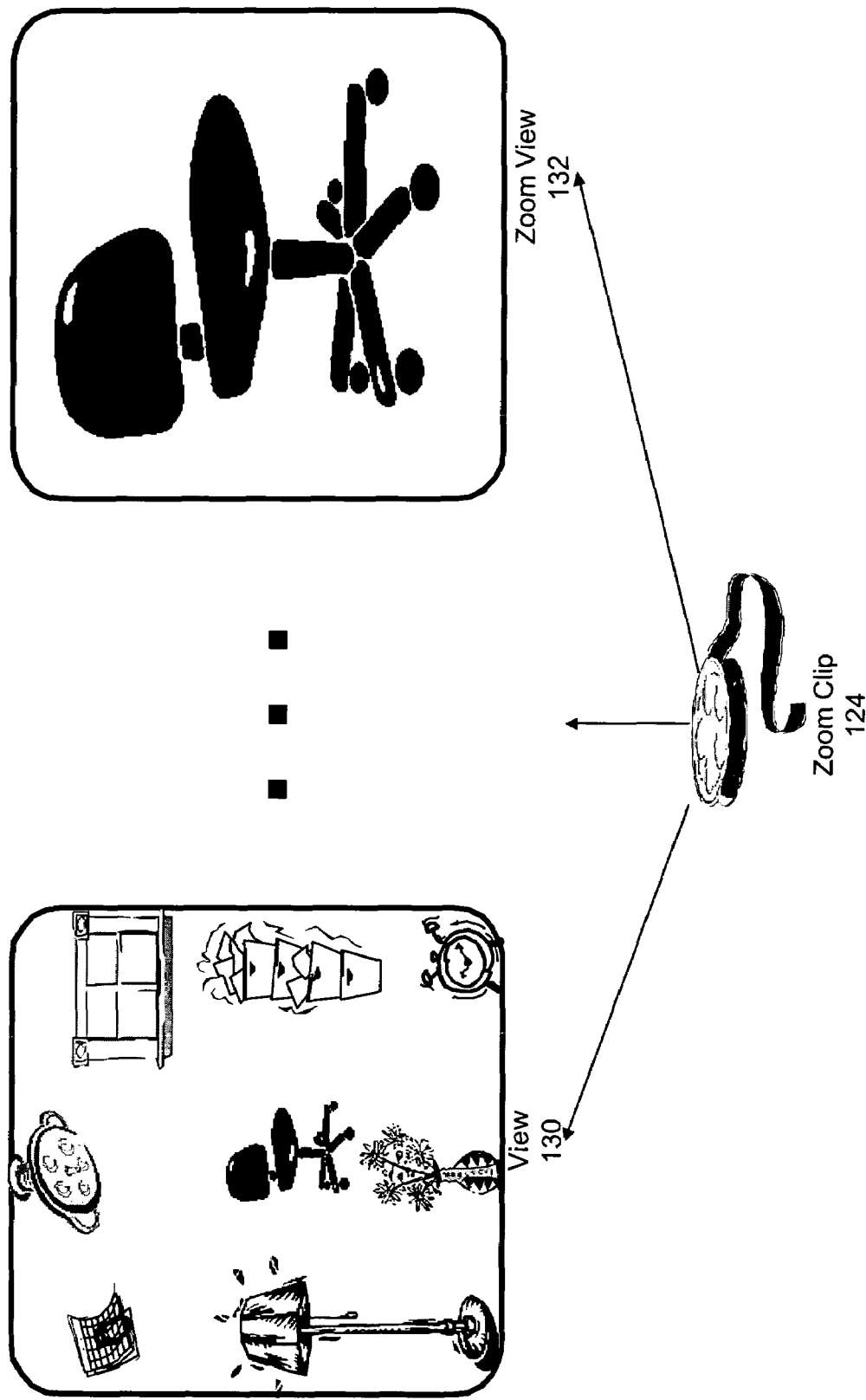

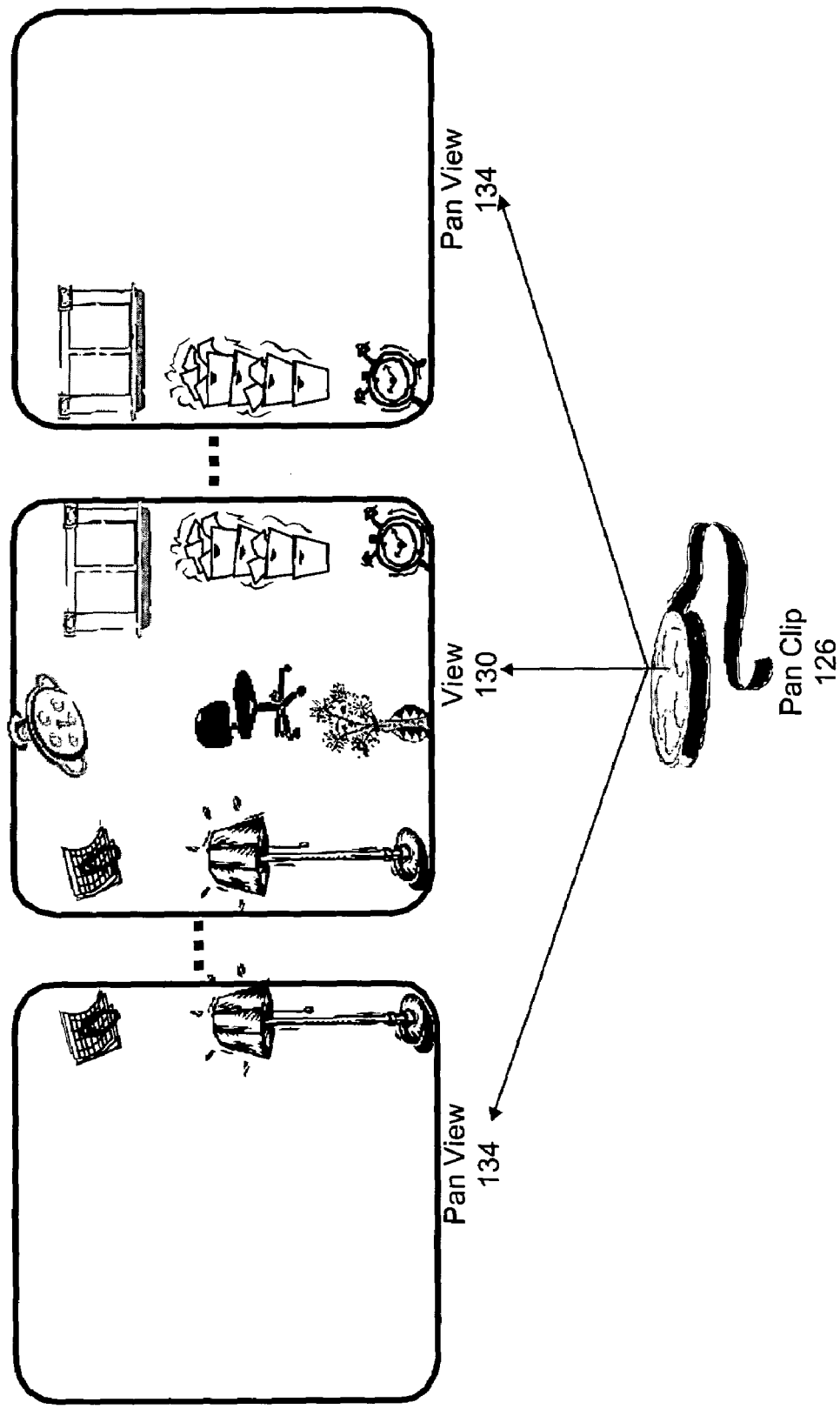

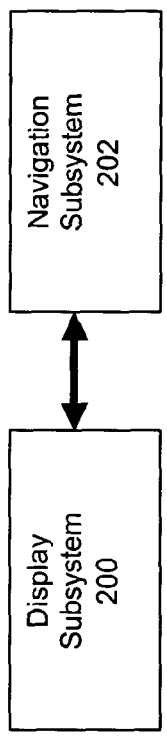
Figure 9
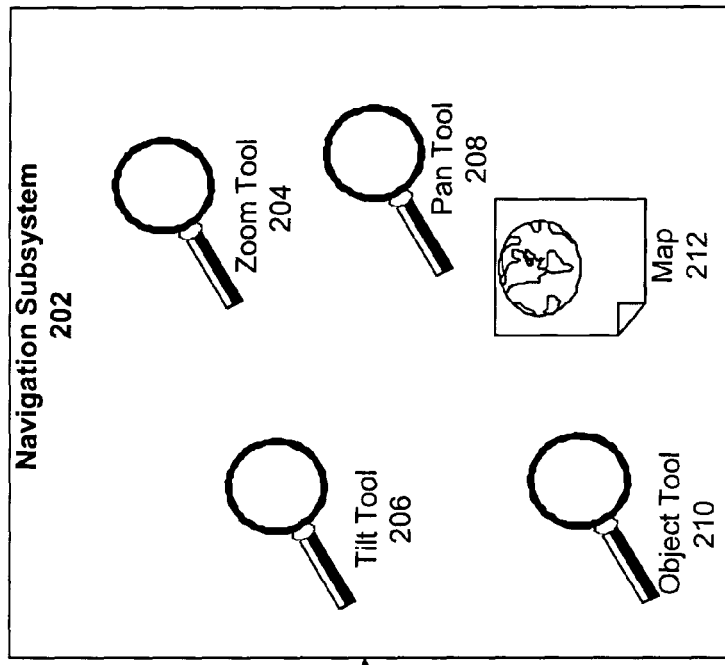
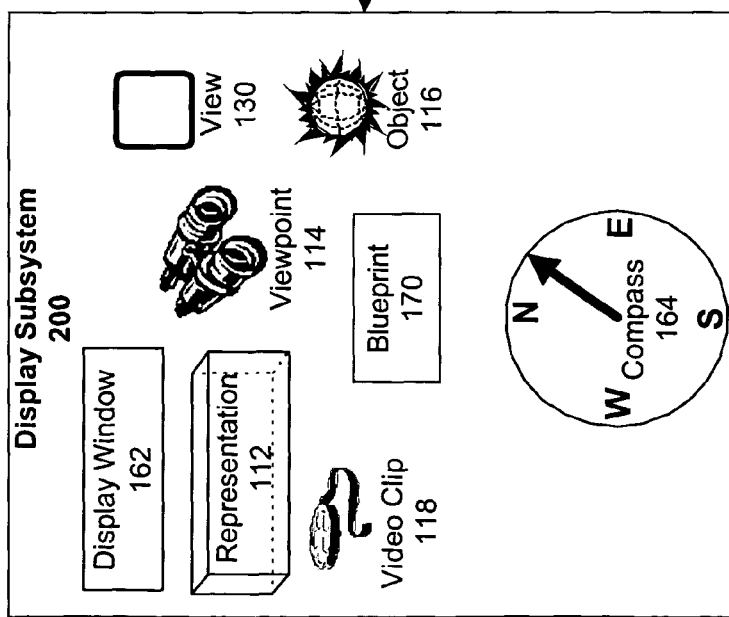
Figure 10

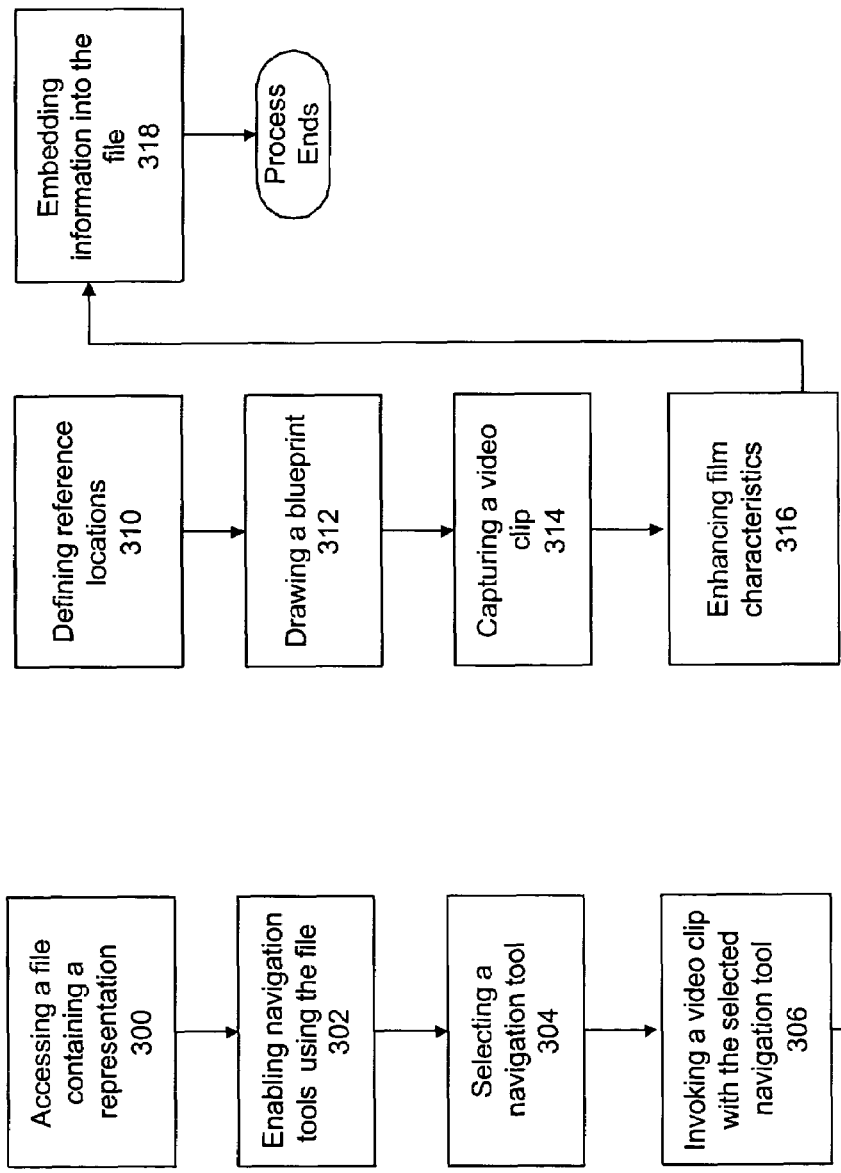

SYSTEM OR METHOD FOR INTERACTING WITH A REPRESENTATION OF PHYSICAL SPACE

BACKGROUND OF THE INVENTION

The invention is a system or method for providing access to interactive video content (collectively, "video system" or simply the "system"). More specifically, the invention is a video system for interacting with a representation of physical space.

The use of digital media has increased significantly because the tools for capturing and transferring digital sounds, still images, and video clips have become increasingly advanced and inexpensive. However, the tools for transforming digital media content into interactive digital video content have not kept up with the advancements in digital media. Existing techniques fail to display representations of physical space in a photo-realistic manner as seen by the human eye. Two types of image distortion, bent edges and blurry digital zooms degrade the quality of the interactive video. Those distortions result in a display that is significantly different from how a human being would perceive the subject matter embodied in the digital media. In summary, the existing interactive video systems fail to accurately capture the human experience. It would be desirable for an interactive video system to incorporate true video processing in a photo-realistic manner. Instead of relying on stitched-together still pictures or image interpolation applications, it would be desirable to use actual video or film Internet-based video systems typically require additional Java or other additional external applications in order to run. Such specific configurations preclude a universal approach to interactive media over the Internet. Different environments require different supporting software, and the resulting fragmentation precludes the market success required for a successful universal system. It would be desirable for an interactive video system to compatible across all major web browsers and platforms.

Existing interactive video systems also suffer from substantial performance problems. These problems are particularly acute in the context of invoking interactive video functionality from a web site or some other Internet-based mechanism. Although the use of high-speed connectivity mechanisms such as cable modems, DSL, satellite, and other mechanisms (collectively "high-speed connections"), most web surfers continue to rely on much slower dial-up connections (collectively "low-speed connections"). Existing interactive video systems involve large files that preclude meaningful real-time processing. It would be desirable for the media files of an interactive video system to be sufficiently compact as to allow real-time performance over a low-speed connection.

SUMMARY OF THE INVENTION

The invention is a system or method for providing access to interactive video content (collectively, "video system" or simply the "system"). More specifically, the invention is a video system for interacting with a representation of physical space.

The system provides access to a representation of physical space (the "representation") that can be navigated and interacted with through the navigation tool interface provided by the system.

The representation can include one or more viewpoints. Each viewpoint can be associated with a location within the representation. One or more video clips can be associated with each viewpoint location, with each video clip representing a series of panoramic, tilt, or zoom activities associated with the particular viewpoint location. Each frame within the video clip can be a view of the system.

Representations can also include one or more objects. Each object can be associated with a location within the representation. One or more video clips and/or still images can be associated with the object. Other object-based functionality can be customized to fit the nature of the object.

The navigation of representations can further be assisted by a blueprint of the representation area, and a compass. In most embodiments, the representation area is presumed not to move, so the blueprint and compass for a particular representation area is fixed. However, the system can include systems where the observer "moves" within the representation and the representation itself "moves" within the context of the outside world. For example, a representation area may represent the internal space of a vehicle such as a boat or car.

In a preferred embodiment, the system is used to provide Internet users with access to interactive digital video content. In other embodiments, the system can function across different types of networks or in a stand-alone environment.

BRIEF DESCRIPTION OF THE DRAWINGS

In the drawings:

FIG. 4 is a block diagram illustrating an example of a zoom clip and a zoom view.

FIG. 5a is a block diagram illustrating an example of a pan clip and two pan views.

FIG. 9 is a block diagram illustrating an example of a subsystem-level view of an interactive video system.

FIG. 10 is a block diagram illustrating an example of a subsystem-level view of an interactive video system.

FIG. 11 is a flow chart illustrating an example of a method for interacting with a representation of physical space.

FIG. 12 is a flow chart illustrating an example of a method for creating a file for an interactive video system.

DETAILED DESCRIPTION

I. Environmental View

Figure 1:
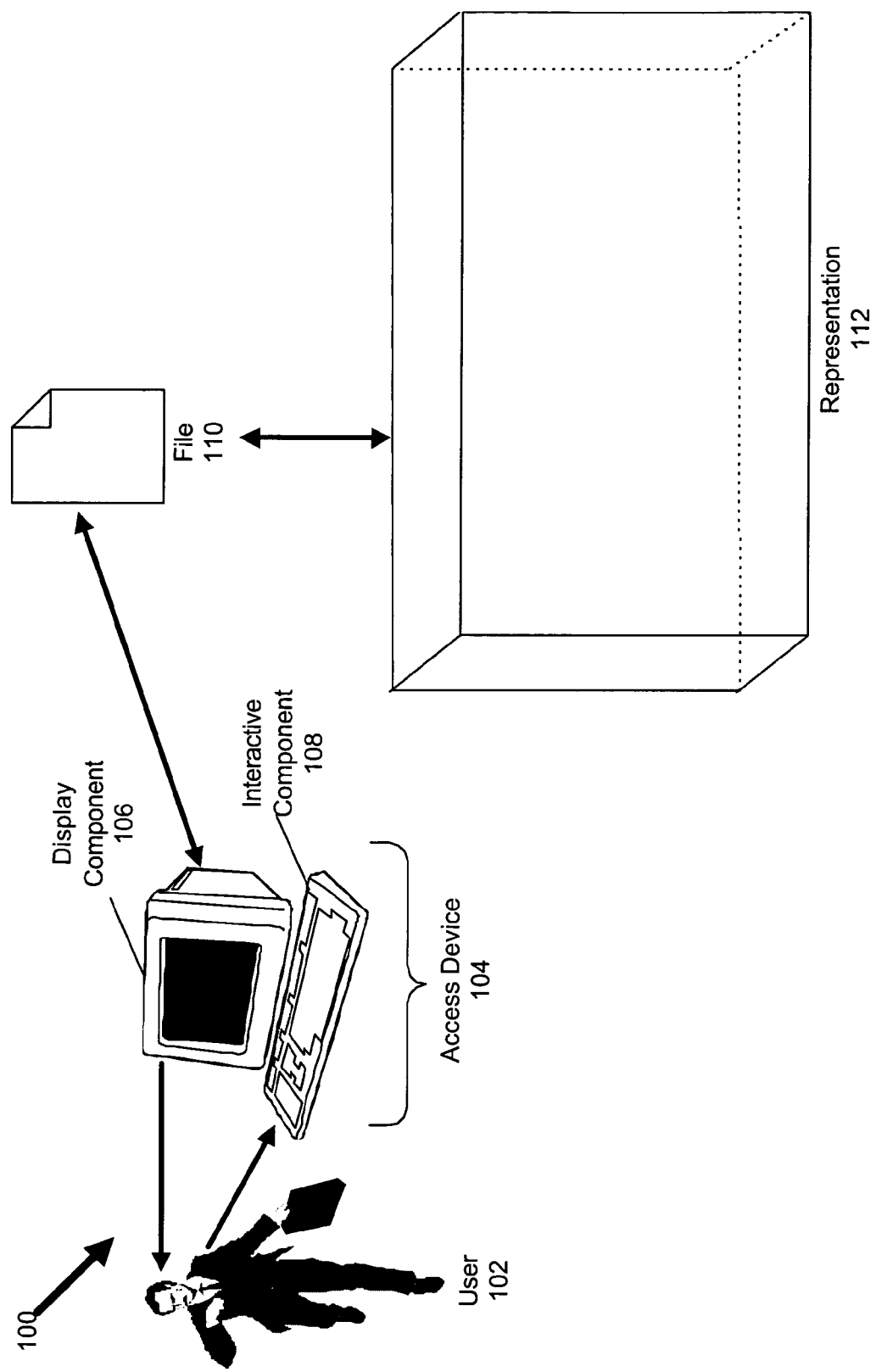
FIG. 1 is process flow diagram illustrating an example of an environmental view of an interactive video system.

FIG. 1 is process flow diagram illustrating an example of an environmental view of an interactive video system 100. A wide variety of different architectures can be incorporated into the system 100, and the system 100 can function in a wide variety of different embodiments.

A. User

A user 102 interacts with the system 100 through an access device 104. In a preferred embodiment, the user 102 is a human being. In some embodiments, the user 102 can be a robot, a neural network, an expert system, or some other form of automated intelligence (collectively, "intelligence technology"). Any human being, non-human organism, organism, application, or machinery capable of manipulating the controls of the system 100 to interact with the video content of the system 100 can be a user 102.

B. Access Device

An access device 104 is any device that allows the user 102 to interact with the system 100. In a preferred embodiment, the access device 104 is a commercially available device such as a desktop computer, laptop computer, mainframe computer, cell phone, personal digital assistant (PDA), or any other device that allows the user 102 to access the Internet. In a preferred embodiment (an "Internet embodiment"), users 102 access the system 100 through a commercially available web browser and a media player, such as the MACROMEDIA FLASH 5.0 software by MACROMEDIA.

In some embodiments, the access device 104 is a client device connected to a network, such as a LAN, WAN, or some other non-Internet based network (collectively "computer network embodiment"). In other embodiments, the access device 104 is a server accessed by the user 102 through some other client device. In still other embodiments, the access device 104 is a stand-alone device that is not connected to any other device.

1. Display Component

Figure 8:
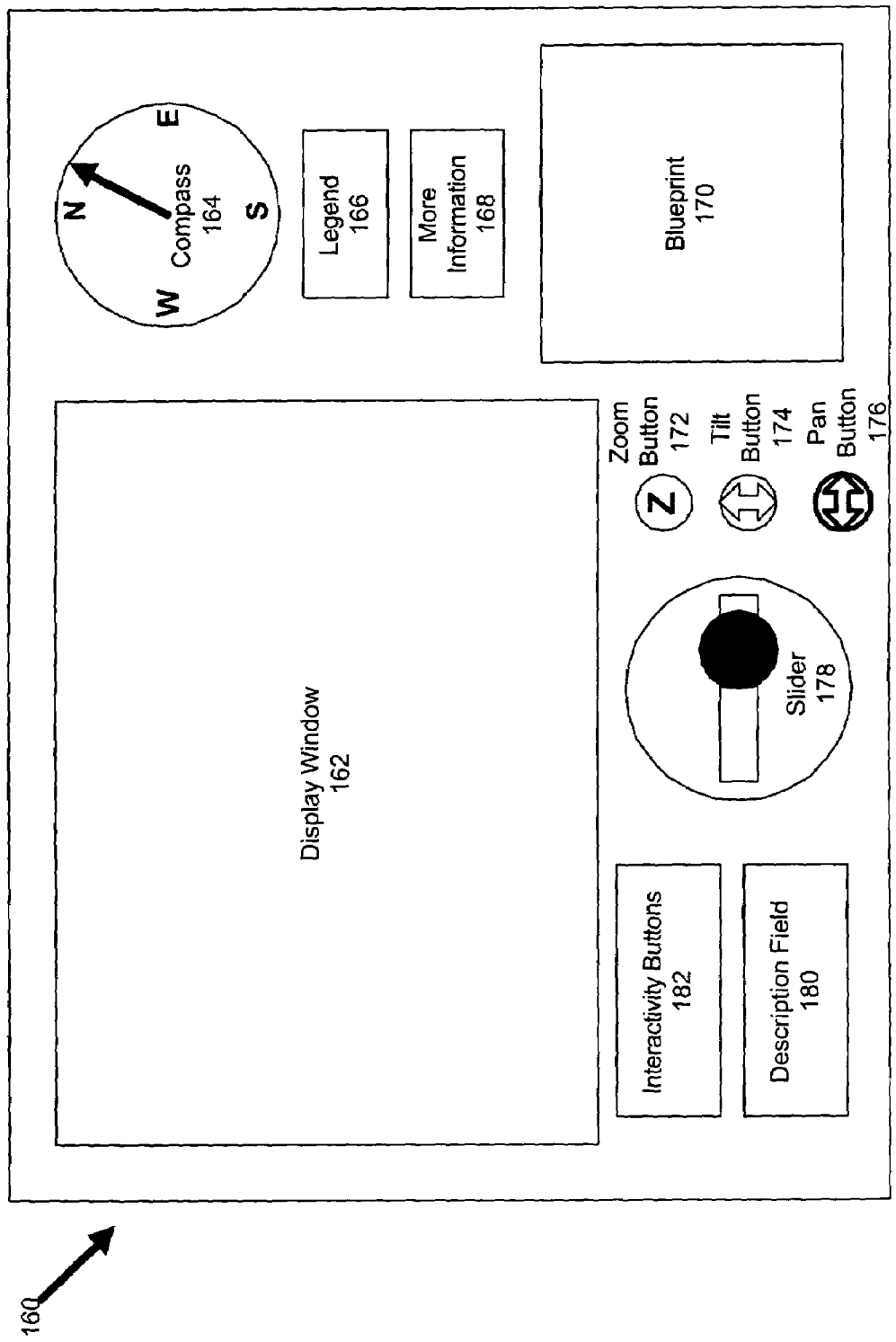
FIG. 8 is a diagram illustrating an example of an interface that can be incorporated into the system.

A display component 106 is typically some type of monitor or display device that is part of or connected to the access device 104. The display component 106 displays the representation of physical space ("representation") 112 navigated by the system 100, as well as the navigation tools provided by the system 100. The system interface and navigations tools are illustrated in FIGS. 8 and 10, and are described in greater detail below.

2. Interactive Component

An interactive component 108 is what allows the user 102 to interact with the system 100 and the video content made accessible by the system 100. The interactive component 108 is what allows the user 102 to transmit instructions to the system 100 so that the system 100 can perform the appropriate interactive activity for the user 102. A common example of an interactive component 108 is a keyboard. Devices such as a mouse, light pen, track ball, voice recognition technology component, or other input devices can also serve as interactive components 108.

C. File

A file 110 is the mechanism by which the system 100 allows users to interact with a representation of physical space ("representation") 112. In a preferred embodiment, the file 110 is in a format such as avi, that is platform independent with respect to its player, and is accessible using a wide variety of different browsers, applications, and technical architectures. Although the creation of the particular file 110 embodying the representation 112 may require several different software applications, as described in greater detail below.

D. Representation

A representation of physical space (a "representation") 112 is embodied in the file 110 that is accessed by the system 100. In many embodiments of the system 100, the representation 112 will be of a place that has an actual physical existence, such as the rooms of a house that is for sale. In other embodiments, the representation 112 can be of a fictional place, such as a representation generated by altering digitally captured media or even through animation and other techniques.

1. Types of Representations

There are a wide variety of different types of representations 112.

a. True Representations

One type of representation can be referred to as a "true representation" 112. True representations 112 represent physical environments that actually exist. True representations 112 can represent a wide variety of different actually existing physical environments, including the rooms of a house; the interior of a vehicle; an outdoor setting such as a field, forest, or jungle; a molecule or similar microscopic view; a solar system or similar telescopic view; or any other environment that physically exists. True representations 112 are incorporated into the system 100 by various cameras, such as video cameras and still image cameras.

B. Fictional Representations

Another type of representation 112 can be referred to as a "fictional representation" 112. Fictional representations 112 are created by combining different aspects of true representations in a way that does not physically exist. One example of a fictional representation 112, would be a representation 112 with Mount Rushmore located within 10 feet of an Egyptian pyramid. Fictional representations 112 are derived from true representations 112.

C. Fantasy Representations

A third type of representation 112 can be referred to as a "fantasy representation" 112. Fantasy representations involve images and video clips that made up, through computer or other animation techniques. Video clips used in a fantasy representation 112 cannot involve actual video footage because what is being represented is purely fictional.

2. Representation Areas

Figure 2:
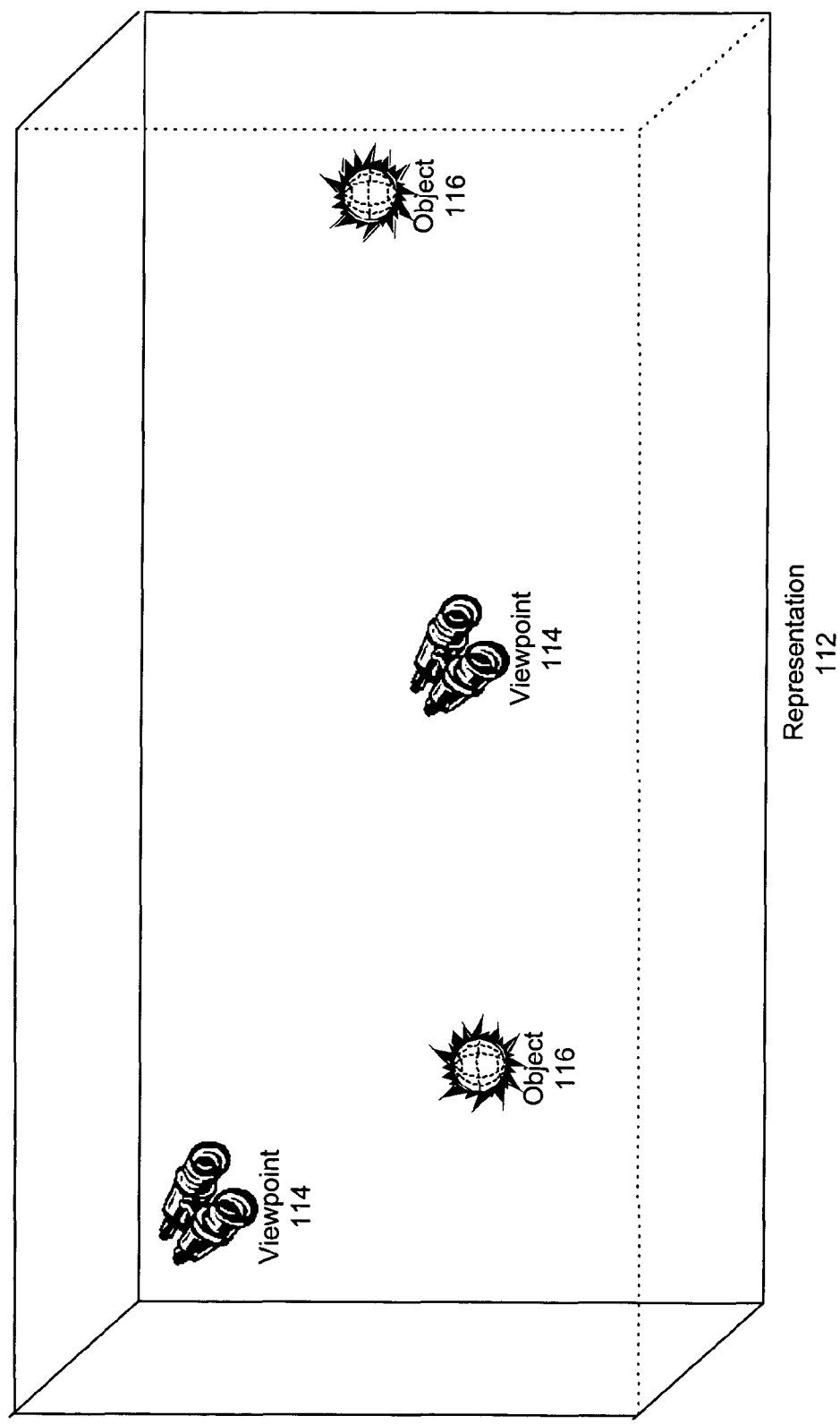
FIG. 2 is a block diagram illustrating an example of a representation of physical space that includes two viewpoints and two objects.

The disclosure in FIG. 2 is a block diagram of a single representation area. Some embodiments of the system 100 may involve more simulated space that can be viewable at one time using the interface of the system 100. Such embodiments involve representations 112 that include more than one representation area 112. This is often a result of the physical space being represented. For example, in navigating a house, only one room or hallway should be viewable at a time because a person in such a house, could only see the contents of a single room or hallway at one time (unless a door is open or there is a window to see through). In such a context, each room or hallway can be referred to as a representation area with the overall representation. Outdoor representations can similarly be divided up into a variety of different representation areas. For example, a view of a waterfall could be blocked by a rock formation.

Representations 112 may also need to be broken down into multiple representation areas due to the interface limitations of the system 100. In certain contexts, the limitations of filming and the limitations of the display component may make it desirable to divide up the representation 112 into two or more representation areas.

In some embodiments of the system 100, the entire representation 112 is made up of only one representation area.

FIG. 2 is a block diagram illustrating an example of a representation 112 that includes two viewpoints 114 and two objects 116. Viewpoints 114 and objects are discussed below. In a preferred embodiment, a representation 112 has at least one viewpoint 114 but need not include any objects 116. In alternative embodiments, a wide variety of different configurations could be used.

II. Viewpoints

A. Introduction to Viewpoints

The representations 112 contained in the file 110 accessed by the system 100 can include one or more viewpoints 114. The representation 112 disclosed in the example provided in FIG. 2 includes two viewpoints 114. Viewpoints 114 are locations within the representation 112 from which the user 102 to free "look around" the representation 112. Each representation area requires at least one viewpoint 114, or else the user 102 is not able to interact with or even view the particular representation area.

In the example of a representation area being an exterior office in a office building, it would probably be desirable to locate a viewpoint 114 at the door of the room. This allows the user 102 to view the room as if the user had just entered the office. It may also be desirable to place a viewpoint 114 at the position of the chair by the desk so that the user 102 can view the office from the perspective of someone sitting at the desk. It may also be desirable to place a viewpoint 114 at any exterior window so that the user 102 can use the system 100 to simulate "looking" outside the window. In such an embodiment, in may also be desirable to place viewpoints 114 at the site of windows within the rooms or other points of interest within the room.

The particular decisions as to where to place viewpoints 114 will depend heavily of the type of representation 112 being simulated, the user's likely purposes in navigating and interacting with the representation 112.

B. Components of a Viewpoint

Figure 3:
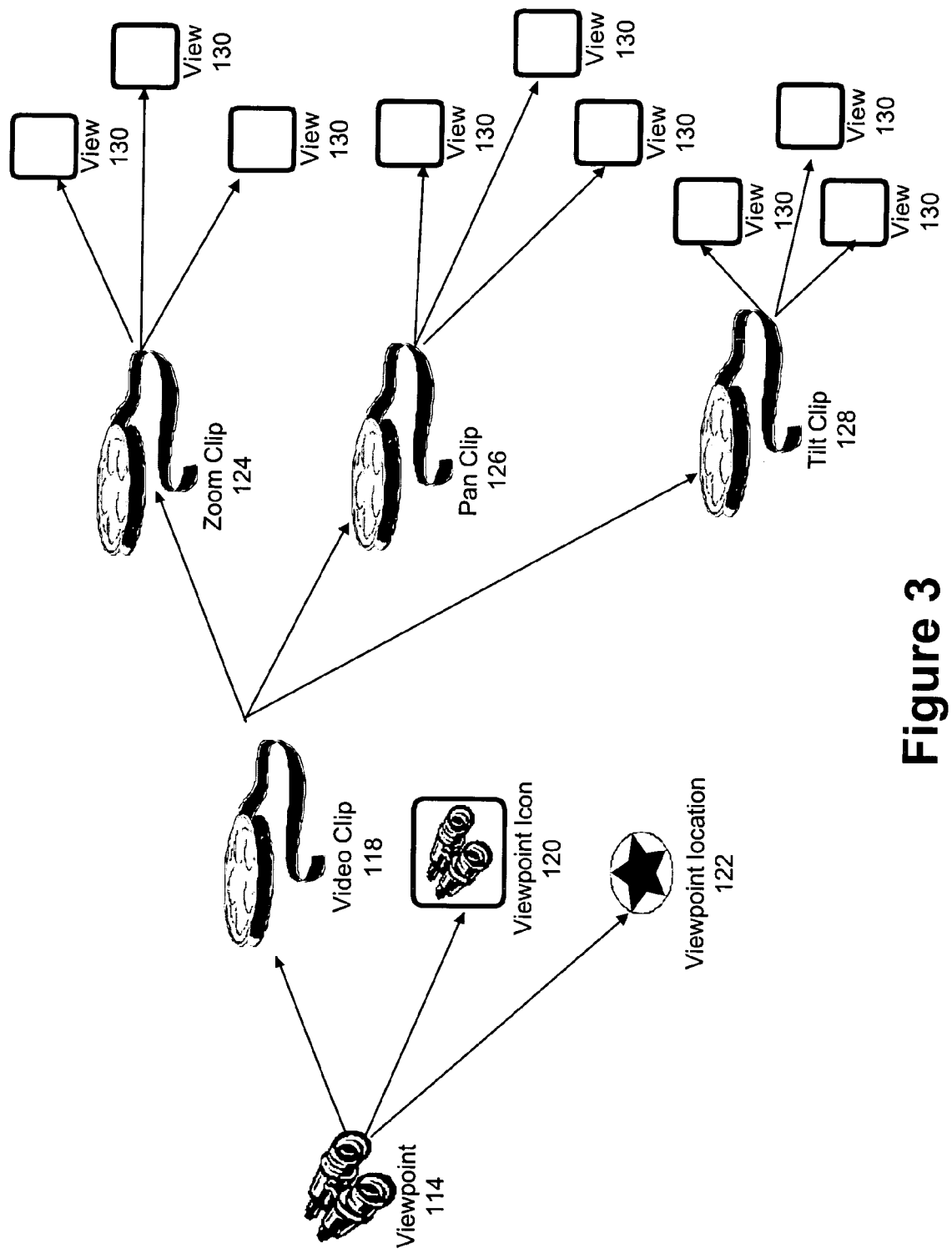
FIG. 3 is a hierarchical diagram illustrating several examples of components that can be included as part of a viewpoint.

FIG. 3 is a hierarchical diagram illustrating several examples of components that can be included as part of a viewpoint 114.

1. Viewpoint Locations

Each viewpoint 114 in the system 100 can be associated with one or more viewpoint locations 122 within one or more representation areas. A viewpoint location 122 is what ties together the particular location within the representation 112 and video footage representing what the user 102 can see from a particular vantage point or location. In most embodiments of the system 100, a viewpoint 114 needs to have a viewpoint location 122, and the viewpoint location is preferably predefined. In certain alternative embodiments (such as video games or other embodiments where the "reality" of the situation is highly flexible), the viewpoint location 122 can be dynamically determined, and the viewpoint 114 need not even be associated with a particular viewpoint location 122.

2. Viewpoint Icons

A viewpoint icon 120 can be used to identify the viewpoint location 122 within the representation area for benefit of the user 102. The existence of the viewpoint icon 120 lets the user 102 know that one or more viewpoint activities can be invoked from that particular location within the representation. The placement of a viewpoint icon 120 typically requires the existence of a viewpoint location 122, but a viewpoint location 122 need not have a viewpoint icon 120 associated with it. Viewpoint locations 122 can be identified in other ways, or need not be identified at all. Viewpoint icons 120 can be displayed in the within the representation 112 itself, as well as in supplementary information sources such as a blueprint, which is discussed in greater detail below.

3. Video Clip (Viewpoint Clips)

Many viewpoints 114 will have one or more video clips 118. However, a viewpoint 114 need not have any video clips associated with it. A viewpoint 114 can simply be associated with a still-image. A video clip 118 is what a user 102 accesses at a particular viewpoint location 122 in order to experience the simulation of "moving" through or "experiencing" the representation 112 in a way that closely resembles how a human being can navigate or experience actual physical space. For example, a video clip 118 could allow the user 102 to simulate the activities of tilting upward to look at the ceiling lamp, to turn his or her head from left to right or right to left to purvey a room, or to focus one's attention (zoom in) on an item of interest. The use of video clips 1118 allows the user 102 to experience the starting point of the activity, numerous interim points, and the final destination view in a highly linear fashion.

With respect to viewpoints 114, there are typically three different types of viewpoint 114 related video clips 118: zoom clips 124; pan clips 126; and tilt clips 128. As illustrated in FIG. 3, each type of video clip 118 can be made up of various views 130. Views 130 are the individual frames within a video clip 118 and views 130 can also be referred to as frames 130. The individual frames (e.g. views 130) that make up a video clip 118 differ from still-frame images in that frames (e.g. views 130) are captured and created at the onset for use as video footage 118. Views 130 are not still-images that are stitched together or subjected to interpolation (collectively a "distorted image") in order to mimic video images. Thus, a still image is not a frame (e.g. a view 130) and a frame or view 130 is not a still image.

a. Zoom Clips and Views

FIG. 4 is a block diagram illustrating an example of the zoom clip 124 and the zoom view 132. The action of "zooming in" is well known in the art of photography and video footage. The action of zooming in provides the viewer with a closer look at what they are looking at. Thus, one or more viewpoints 114 in a representation 112 may be configured to allow the user 102 to zoom in on the subject matter at hand. Examples of zooming functionality can include looking outside a window to take a closer look at a tree in the yard; examining the title of a book on a bookshelf at the other end of the room; or any other example involving taking a closer look at what is already within view. Unlike the panoramic and tilt activities described below, zooming in does not change what the user 102 is viewing, but instead, narrows the scope of what is being seen in support of focusing on a particular subset of what is otherwise visible. In a preferred embodiment, the zoom is an optical zoom, not a digital zoom. Other embodiments may include digital zooms or even combinations of both optical and digital zooms.

In the example in FIG. 4, the view 130 associated with the particular viewpoint 114 is that of an office that includes various objects such as a lamp, a chair, and a file cabinet. The zoom clip 124 contains video footage that zooms in on the chair as is indicated by the zoom view 132 at the right end of the figure. A video clip 118 (a zoom clip 124) instead of one or more still-pictures is used to support the functionality of zooming in so that a user 102 zooming in experiences the representation 112 in a way that closely mimics the way a human being would experience the physical space being represented. There can be numerous zoom views 132 on the zoom clip 124 between the initial view 130 and the maximum zoom view 132.

b. Pan Clips and Pan Views

FIG. 5a is a block diagram illustrating an example of the pan clip 126 and two pan views 134. Invocation of the pan clip 126 by the user 102 occurs when the user 102 wants to look to the left or to the right of the initial view 130 visible for the particular viewpoint 114. As is visible in the figure, items on the far left side of the initial view 130 are on the far right side of the maximum left pan view 134. Correspondingly, items of the far right side of the initial view 130 are located on the far left side of the maximum right pan view 130. There are potentially numerous pan views 134 between the maximum left pan view 134 and the maximum right pan view 134. The pan clip 126 includes in the form of video footage, the images in the various pan views 134.

Figure 5C:
FIG. 5c is a diagram illustrating one example of a standard pan range of 270°.
Figure 5E:
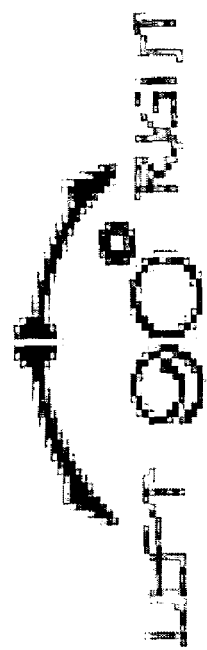
FIG. 5e is a diagram illustrating one example of a standard pan range of 90°.
Figure 5B:
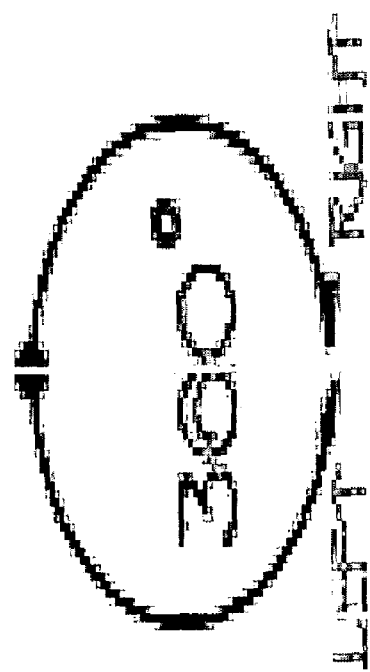
FIG. 5b is a diagram illustrating one example of a standard pan range of 360°.

Pan clips 126 vary with respect to the angles between a maximum left pan view 134 and a maximum right pan view 134. In some embodiments, standard ranges of angles are used. However, non-standard angle ranges can also be used in those embodiments. FIG. 5b is a diagram illustrating one example of a standard pan range of 360°. FIG. 5c is a diagram illustrating one example of a standard pan range of 270°.

Figure 5D:
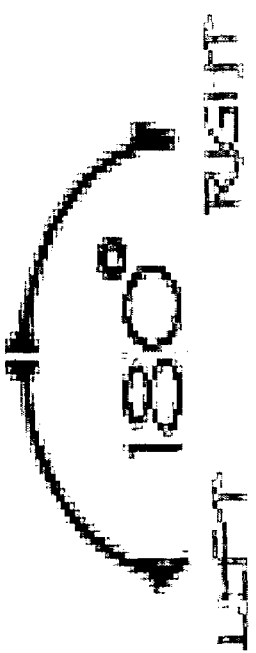
FIG. 5d is a diagram illustrating one example of a standard pan range of 180°.

FIG. 5d is a diagram illustrating one example of a standard pan range of 180°. FIG. 5e is a diagram illustrating one example of a standard pan range of 90°.

C. Tilt Clips and Tilt Views

Figure 6:
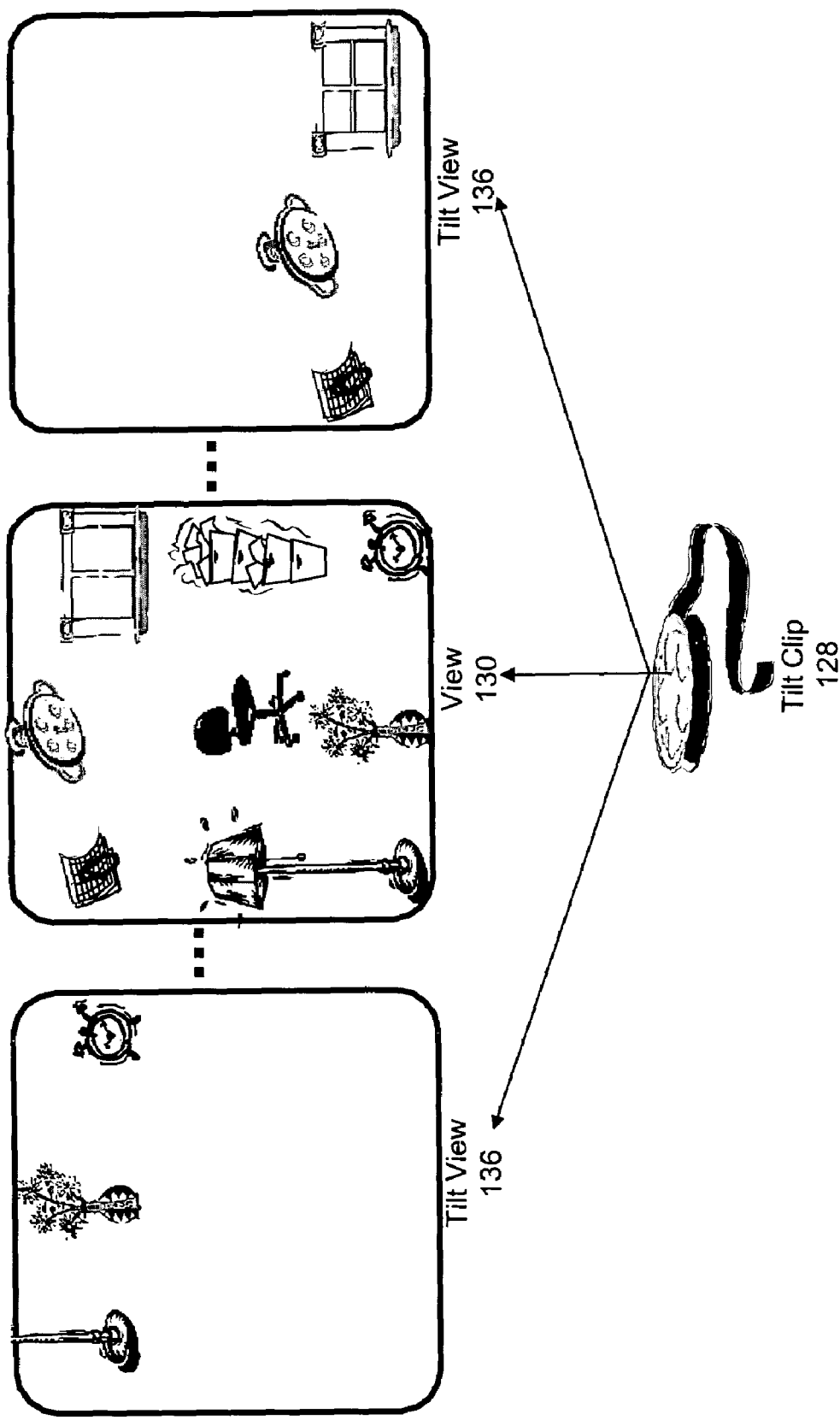
FIG. 6 is a block diagram illustrating an example of a tilt clip and two tilt views.

FIG. 6 is a block diagram illustrating an example of the tilt clip 128 and two tilt views. As panoramic activity is horizontal, tilting is a vertical activity. Tilt clips 128 can include looking downwards, looking upwards, or looking both upwards and downwards. Just as pan clips 126 can be described in light of the range of angles, so can tilt clips 128. In the example provided in FIG. 6, tilting occurs in both the upward and downward directions in relation to the initial view 130.

Items at the bottom of the initial view 130 are at the top of the maximum downward tilt view 136. Correspondingly, items at the top of the initial view 130 are at the bottom of the maximum upward tilt view 136. Just as with the zoom and panoramic activities, the use of a video clip makes the experience of tilting mimic what a human being would experience tilting their head upwards or downwards in physical space. There can be numerous tilt views 136 between a maximum downward tilt view 136 and a maximum upward tilt view 136. The movement amongst tilt views 136 occurs in a liner manner to preserve the "human" experience.

III. Objects

Figure 7:
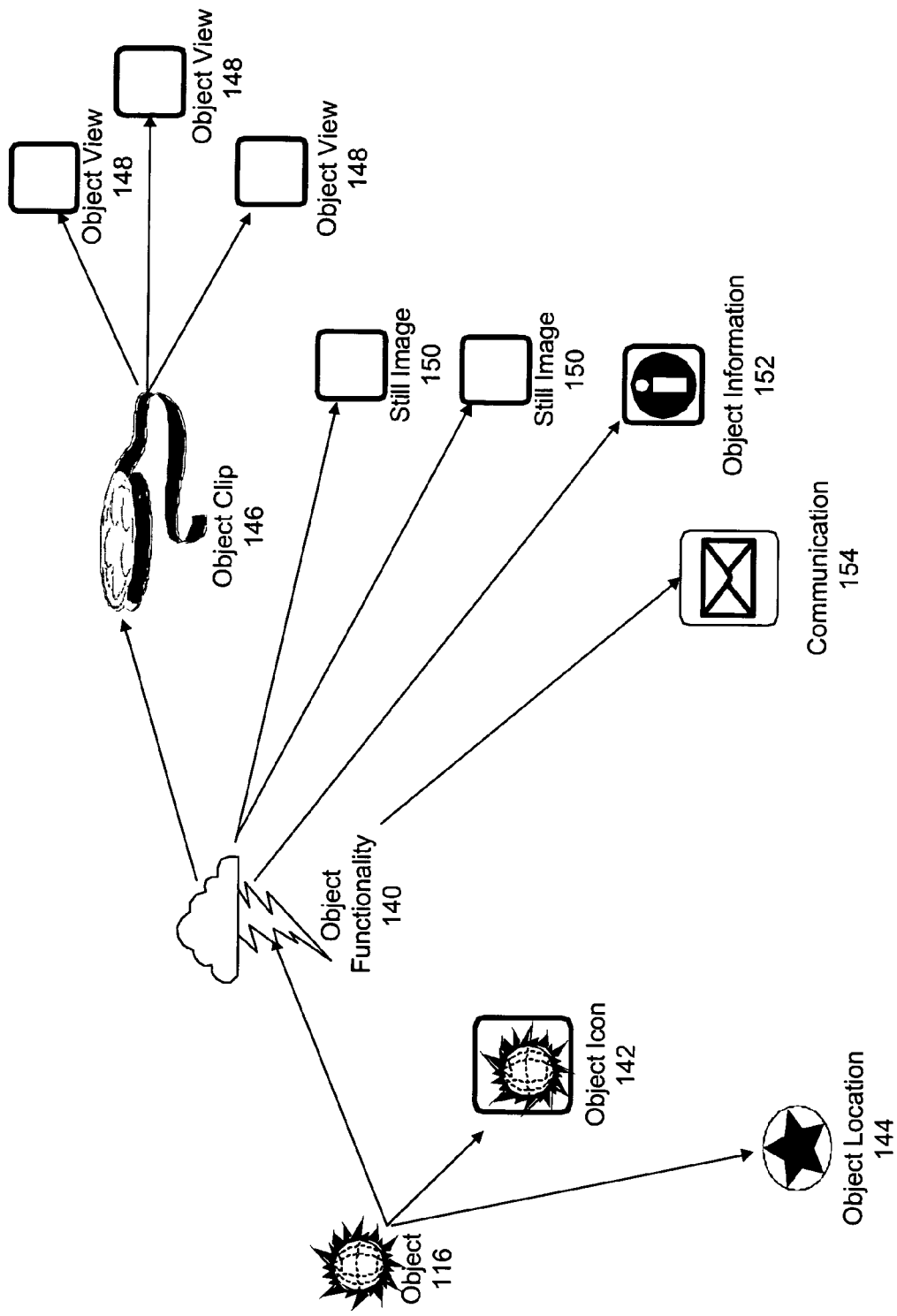
FIG. 7 is a hierarchical diagram illustrating an example of the components that can be included in an object.

Unlike viewpoints 114, objects 118 are items that facilitate the possibility of more that merely perception-related interactions. For example, an object 118 could be: a desk drawer capable of being opened; a piece of merchandise that can be examined and purchased; a top that can be spun; or any other item or object to which it would be desirable to associate the possibility of certain actions. Objects 118 can be visible from one or more viewpoints 114. FIG. 7 is a hierarchical diagram illustrating an example of the components that can be included in an object.

A. Object Locations

Each object 116 in the system 100 can be associated with one or more object locations 144 within one or more representation areas. An object location 144 is what ties together the particular location within the representation 112 and the various attributes and functionality associated with the object 118. In most embodiments of the system 100, the object 118 needs to be associated with an object location 144, and the object location 144 is preferably predefined. In certain alternative embodiments (such as video games or other embodiments where the "reality" of the situation is highly flexible), the object location 144 can be dynamically determined, and the object 116 need not even be associated with a particular object location 144.

B. Object Icon

An object icon 142 can be used to identify the object location 122 for the user 102. The placement of a object icon 142 typically requires the existence of an object location 144, but an object location 144 need not have an object icon 142 associated with it. Object locations 144 can be identified in other ways, or need not be identified at all. Object icons 142 can be displayed in the within the representation 112 itself, as well as in supplementary information sources such as a blueprint, which is discussed in greater detail below.

C. Object Functionality

As mentioned above, objects 116 can involve functionality beyond the mere viewing of the object 116 in a way that occurs by navigating the representation 112 through one or more viewpoints 114. The range of object functionality 140 is virtually limitless. Examples of object functionality 140 include: invoking one or more object clips 146; invoking one or more still images 150; displaying object information 152; initiating a communication 154; or invoking any other action that can be invoked through the access device 104 being used by the user 102. Object functionality 140 can also be referred to as ancillary content items that exist within the representation 112. For example, in a virtual store embodiment, purchased items can be objects, and the ancillary content can be a price, an audio comment about the item, a website link to the vendor of the item, or any other form of information.

1. Object Clips and Object Views

An object clip 146 is a video clip 118 that corresponds to an object 116, and not a viewpoint 114, within the representation 112. Any video clip 118 that could of interest to the user 102 in the context of the particular representation 112, the particular object 116, and/or the particular user 102 can be the object clip 146. Examples of object clips 146 include video footage of: merchandise that can be purchased; an item being rotated 360° on a turnkey; news reports relating to the object 114; advertisements for the purchase of the particular object 114; and any other video clip 118 that would be of potential interest to the user 102 or the organization responsible for the representation 112.

Many objects 142 may have one or more video clips 118 associated with them. However, an object 116 need not have any video clips 118 associated with it. As an alternative to video footage, the object 114 can simply be associated with one or more still-images 150 of the object 114. However, it is the video clip 118 of the object 114 (e.g. the object clip 146) that allows the user 102 to access photo-realistic video of the object 116 in a way that allows the user to "experience" the object 114 in way that human being could experience the object 114 in the physical world. For example, an object clip 146 of the object 114 spinning on a variable speed turntable would allow the user 102 to view such an activity in a photo-realistic manner.

Just as viewpoint video clips 118 are made up of various views 130, so to are object clips 146. Each individual frame in an object clip 146 can be referred to as an object view 148. Object views 148 are different than still-images 150 because object views 148 are part of video footage, and need not be artificially stitched together or extrapolated in order to generate video footage.

2. Still Images

Regardless of whether an object 114 is associated with one or more object clips 146, the object can also be associated with one or more still images 150. Still images 150 can be effective ways to display items that are essentially two-dimensional, such as a painting or photograph. However, a virtual representation 112 of an art gallery could use still images 150 for the paintings while relying on object clips 148 to provide footage relating to the artist and the work. The combinations of still images 150 and object clips 146 that can be incorporated into the system 100 are limitless.

3. Object Information

In addition to an object 116 being associated with still images 150 and object clips 146, objects 116 can also be associated with non-image based formats of object information 152. Examples of object information can include: narrative text describing the object 114; sounds such as narration describing the object 114 or even "sound effects" relating to the object 116; links to related web sites; contact information; or any other format of information that is not limited to a visual image or video footage. In the example of a representation 112 of an art gallery, the object 116 could be a vase and the object information 152 would be text identifying the artist, the name of the work, and the purchase price.

4. Communications

Objects 116 can be preconfigured to facilitate communications 154 between the user 102 and some other third party. In the example of an art gallery, object functionality 140 can include the ability of the user 102 to send an e-mail inquiring about a particular piece of artwork or even initiating a transaction to purchase a particular piece of artwork. The range of automatically initiated communications 154 can include e-mail, facsimile, paging, instant messaging, chat room postings, paper correspondence, telephone calls with simulated voices, and any other form of communication 154 that can potentially be invoked by the user 102 from the access device 104.

IV. Interface View

FIG. 8 is a diagram illustrating an example of an interface 160 that can be incorporated into the system 120. The interface 160 can also be referred to as a navigation interface 160 because it allows the user 102 to navigate the representation 112. The system 100 can incorporate a wide variety of different interfaces and a wide variety of different interface configurations. In some embodiments of the system 100, there are multiple ways to perform the same action. For example, a button can be activated by clicking a mouse, typing on a keyboard, speaking into a voice recognition device, or any other technology that can receive user 102 inputs. Various buttons and displays on the interface 160 can be enabled or disabled as appropriate given the characteristics of the representation 112 and the relevant representation locations. The system 100 can incorporate a wide variety of different interfaces with a wide variety of different buttons, windows, and other controls.

A. Display Window

A display window 162 is the mechanism by which the user 102 views a representation area and any object icons 142 and viewpoint icons. Video clips 118 are viewed through the display window 162. There can be multiple display windows 162 in a single interface 160. In a multiple-display window 162 embodiment, the user 102 can view the representation area from more than one viewpoint 114 in a simultaneous manner.

B. Compass

A compass 164 provides users 102 with directional information at each viewpoint 114 and object 116 within the representation area. The direction indicated by the compass 164 is the direction that the user 102 is facing within the representation area. The compass 164 moves as the user 102 moves within the representation area.

C. Legend Button

A legend button 166 can be clicked on by the user 102 to identify how the various icons (such as viewpoint icons 120 and object icons 142) appear on the navigation interface. The legend button 166 can be used as a "key" or an "index." In some embodiments, pressing the legend button 166 will cause a display area to appear on the navigation interface 160, and the display area will list the various icons and the names for the various icons.

D. "More Information" Button

A "more information" button 168 can be activated by the user 102 to obtain more information about the representation area, viewpoint 114, or object 116 that is the current "focus" of processing. For example, in a virtual store embodiment of the system 100, the object 116 could be an item for sale. Pressing the "more information" button 168 would in that context, cause information about the item (such as purchase price, manufacturer, etc.) to appear on screen.

E. Blueprint

A blueprint 170 can be used to display a diagram of the representation 112 or a representation area. In an embodiment where the representation area is the interior of a building, the blueprint 170 will resemble a "floor plan." Different embodiments of the system 100 may incorporate different degrees of detail in the blueprint 170. Typically, the blueprint 170 is a two-dimensional diagram. If the blueprint 170 is a two-dimensional diagram, then multiple blueprints 170 can be used to convey information describing the entire three-dimensional representation area. For example, one blueprint 170 can relate to the x-y plane, while another blueprint 170 could describe the y-z plane.

In a preferred embodiment, viewpoint locations 122 and object locations 144 are identified in the blueprint by the icons. In a preferred embodiment, the various icons can be activated by the user 102 through the blueprint 170 as well as through the display window 162.

F. Zoom Button

A zoom button 172 allows the user 102 to invoke the zoom clip 124 associated with a particular viewpoint location 122. After activating the zoom button 172, manipulation of a slider 178 allows the user 102 to zoom in or zoom out (e.g. navigate between the various views 130 making up the zoom clip 124) with respect to the representation area embodied in the zoom clip 124. In a preferred embodiment, the zoom button 172 invokes a photo-realistic zoom clip 124. If a zoom clip 124 does not exist for a particular viewpoint 114, the zoom button 172 should be invisible (or at least disabled) when the user 102 is viewing the representation area from that particular viewpoint 114.

F. Tilt Button

A tilt button 174 allows the user 102 to invoke the tilt clip 128 associated with a particular viewpoint location 122. After activating the tilt button 174, manipulation of a slider 178 allows the user 102 to navigate the representation area in the display window 162 as if the user 102 were in the room tilting his or her head in a vertical manner. In a preferred embodiment, the tilt button 174 invokes a photo-realistic tilt clip 128. If a tilt clip 128 does not exist for a particular viewpoint 114, the tilt button 174 should be invisible (or at least disabled) when the user 102 is viewing the representation area from that particular viewpoint 114.

G. Pan Button

A pan button 176 allows the user 102 to invoke the pan clip 126 associated with a particular viewpoint location 122. After activating the pan button 176, manipulation of a slider 178 allows the user 102 to navigate the representation area in the display window 162 as if the user 102 were turning his or her head in a horizontal manner. In a preferred embodiment, the pan button 176 invokes a photo-realistic pan clip 126. If a pan clip 126 does not exist for a particular viewpoint 114, the pan button 174 should be invisible (or at least disabled) when the user 102 is viewing the representation area from the particular viewpoint 114.

H. Slider

A slider control 178 allows the user to "navigate" video clips 118 representing the representation area(s). The slider control 178 will offer the user different options, depending on the characteristics of the viewpoint location 122 or object location 144 that is currently "active." For example, if the tilt button 174 is pressed, the slider 178 will be a vertical control allowing the user 102 to tilt the view in the display window 162 in a vertical manner. Similarly, if the pan button 176 is pressed, the slider 178 will be a horizontal control, and so on and so forth. In situations involving object functionality 140, the slider control 178 can involve multiple different controls for interacting with the object clip 146, still images 150, object information 152, communications 152, or other object functionality 140.

I. Interactivity Buttons

Various interactivity buttons 182 can allow the user 182 to interact with the individual or organization (collectively "sponsor" or "host") making available the representation 112. For example, the interactivity buttons 182 can be used by the user 102 to send an e-mail, instant message, facsimile, or other communication to the sponsor or host of the representation 112. Pre-defined "help" functionality can be provided to users 102 through the use of the interactivity buttons 182. The content accessed by the interactivity buttons can be customized in accordance with the particular viewpoint location 122 or object location 144 that is currently active in the display window 162, or the content can be generic to the representation area or even representation 112 as a whole.

J. Description Field

A description field 180 can be used to provide the user 102 with information about the representation 112 as they navigate the representation 112 or representation area. In a preferred embodiment, the description field 180 is always on, providing users 102 with information relating to the currently "active" viewpoint location 122 or object location 144. In such an embodiment, pressing the "more information" button 168 will result in more detailed information. The description field 180 provides descriptive information without otherwise blocking the view to the other buttons, controls, and windows of the navigation interface 160. The description field 180 can also be referred to as a label.

V. Subsystem-Level View

FIG. 9 is a block diagram illustrating an example of a subsystem-level view of the interactive video system 100. The functionality of the system 100 can be divided up into two subsystems, a display subsystem 200 and a navigation subsystem 202. FIG. 10 provides a more detailed example of one subsystem-level view of the system 100.

A. Display Subsystem

The display subsystem 200 is the means by which the representation 112 is made available to the user 102 for viewing. As discussed above, the representation 112 and the various representation areas can be viewed by the user 102 through one or more display windows 162. The display subsystem 200 may also include the compass 164 and blueprints 170 describing the representation 112. All video clips 118 and views 130, whether relating to objects 116 or viewpoints 114, are part of the display subsystem 200.

B. Navigation Subsystem

The navigation subsystem 202 can include any and all of the tools used to interact with the system 100 and navigate the representation 112. The navigation subsystem is responsible for capturing interactions with the user 102 so that the system 100 can provide an interactive experience through the display subsystem 200 for the user 102.

A zoom tool 204 allows the user to invoke zoom clips 124 and zoom views 132. A variety of different interface mechanisms can be included to allow the user 102 to manipulate the zoom tool 204, such as the zoom button 172 and slider 178 discussed above.

A tilt tool 206 allows the user 102 to invoke tilt clips 128 and tilt views 136. A wide variety of different interface mechanisms can be included to allow the user 102 to manipulate the tilt tool 206, such as the tilt button 174 and slider 178 discussed above.

A pan tool 208 allows the user 102 to invoke pan clips 126 and pan views 134. A variety of different interface mechanisms can be included to allow the user 102 to manipulate the pan tool 208, such as the pan button 176 and slider 178 discussed above.

An object tool 210 allows the user 102 to invoke object functionality 140, object clops 146, object views 148, object information 152, and communications 154. A variety of different interface mechanisms can be included to allow the user 102 to manipulate the object tool 210. In a preferred embodiment, those interface mechanisms are customized with respect to the particular object 116 or type of object. For example, items to be purchased from a virtual store can involve a common set of interface mechanisms that differ from the interface mechanisms of objects 116 in a video game. The object tool 210 can include a click tool, an active clickable area, and a scripted behavior relating to the active clickable area in the representation 112.

The navigation subsystem 202 should include some mechanism for storing the relationships between the representation 112 and the various viewpoints 114, objects 116, video clips 118, and views 130. Such a mechanism can be referred to as a map 212. The map 212 can be embodied in a wide variety of different formats using a wide variety of different mapping heuristics. In a preferred embodiment, the map 212 is embedded in the file 110, discussed above. In alternative embodiments, a series of files 110 can be used.

In many embodiments, the file 110 is viewable through the use of a browser such as a Web browser. In preferred embodiments, no external application (e.g. no application besides the browser) is required to support the functionality of the system 100. In a preferred embodiment, the browser is a platform independent browser. In some embodiments, the browser will include a build it media player. In other embodiments, an external the system 100 will interface with an external application.

Many different processes and heuristics can be used to create a file 110 for the system 100. In a preferred embodiment, the file 110 is a compressed .avi file that is less than 1% of the size of the initial avi file used to create the compressed avi file. Depending on the embodiment, the compression percentage can range from 10% to 0.1%. The process for encoding the video clips 118 into the file 110 can be referred to as an encode heuristic. By using compressed files 110 that are small in size, the user 102 can access the system 100 through a low-speed "dial-up" connection and still invoke photo-realistic interactions with the system 100.

VI. Process-Level Views

A. Process for Using the System

FIG. 11 is a flow chart illustrating an example of a method for interacting with a representation 112 of physical space. The user 102 accesses the file containing the representation 112 at 300. As discussed above, this can preferably be done through a platform-independent web browser without requiring external applications such as Java applets. The navigation tools are enabled at 302 through the invocation of the file 110. In a preferred embodiment, the user 102 invokes the file 110 through the browser, typically by clicking on a selection of some type. At 304, the user 102 selects one of the navigation tools found in the navigation subsystem 202 or the navigation interface 160. Through the use of the navigation subsystem 202 or the navigation interface 160, video content is selected and invoked at 306.

B. Process for Creating a File for the System

FIG. 12 is a flow chart illustrating an example of a method for creating the file 110 for the interactive video system 100. The various reference locations (for objects 116 and viewpoints 114) are defined at 310. In some embodiments, there may be only one reference location.

One or more blueprints 170 can be defined at 312. The system 100 does not need to incorporate blueprint 170 functionality in order for the system 100 to function, but it is helpful to include such functionality.

One or more video clips 118 can be captured at 314. Those video clips 118 are preferably enhanced at 316, a process that is described below. At 318, the various video clips 118 and other forms of information relating to the representation 112 are embedded into the file 110.

C. A Second Example of a Process for Creating a File

Figure 13:
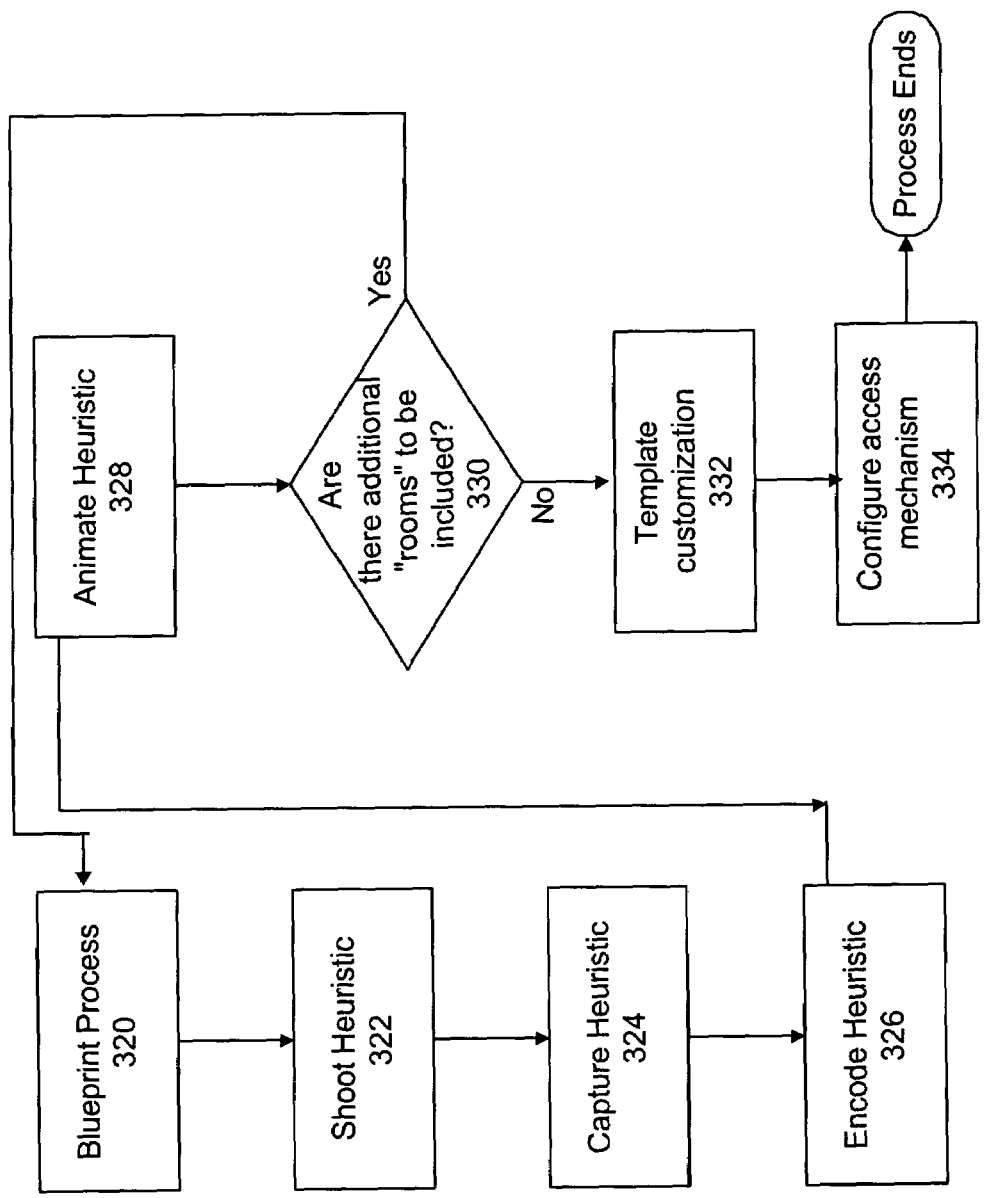
FIG. 13 is a detailed flow chart illustrating an example of a method for creating a file for an interactive video system.

FIG. 13 is a detailed flow chart illustrating an example of a method for creating a file 110 for an interactive video system 100.

1. Suggested Equipment

The equipment and files necessary to perform this process include a digital video camera. The camera should include a tripod, and a three chip camera with a fluid head tripod is preferred. In some embodiments, a one chip camera with a standard tripod can also yield excellent results. A compass is recommended with respect to embodiments of the system 100 that include compass 164 functionality. Some type computer device is needed to create the necessary file(s) 110. Current applications that are used in one embodiment of the system 100 include After Effects 4.0 by ADOBE, Premier 6.5 by ADOBE, Flash Turbine 1.0 by BLUE PACIFIC, Flash 5.0 by MICROMEDIA, and Dreamweaver 3.0 by MACROMEDIA. The system 100 is highly flexible and configurable. A wide variety of different software applications can be used to create files 110 for the system 100. If Flash movie files (.fla files) are used, there are preferably three files: one being a premovie file (premovie.fla), one being a template for the controller (alpha_ctr.fla) and one being a template for actions and graphics (alpha_ptz.fla).

2. Blueprint Heuristic

In a preferred embodiment, blueprint 170 functionality is included in the system 100. Even if a blueprint 170 is not displayed on the interface 160, it is preferable to begin the process of creating a file 110 of the representation 112 by defining what the representation 112 is at 320.

For true representations, this process involves reviewing the representation area that is to be shot and decide upon camera angles, lighting, etc. Then a rough sketch of a blueprint 170 of the representation area and any relevant objects 114. It is desirable to use a standardized naming convention for identifying various shots.

3. Shooting Heuristic

After the blueprint 170 is created (or at least a rough sketch is created), a shoot heuristic for the representation area (or even the entire representation 112) can be performed at 322. The system 100 can incorporate the results of a wide variety of different shooting heuristics at 322. In a true representation embodiment, videographic and photographic expertise should be applied in order to judge lighting, manage mirrors, and to get optimal angles. Such expertise can take many forms, depending on the context of the shot. Prior to any filming the digital camera must have several features configured properly. These features include, white balancing, setting the exposure, and disabling the digital zoom. Once the camera is properly configured, specific procedural steps can be followed for filming.

Figure 14:
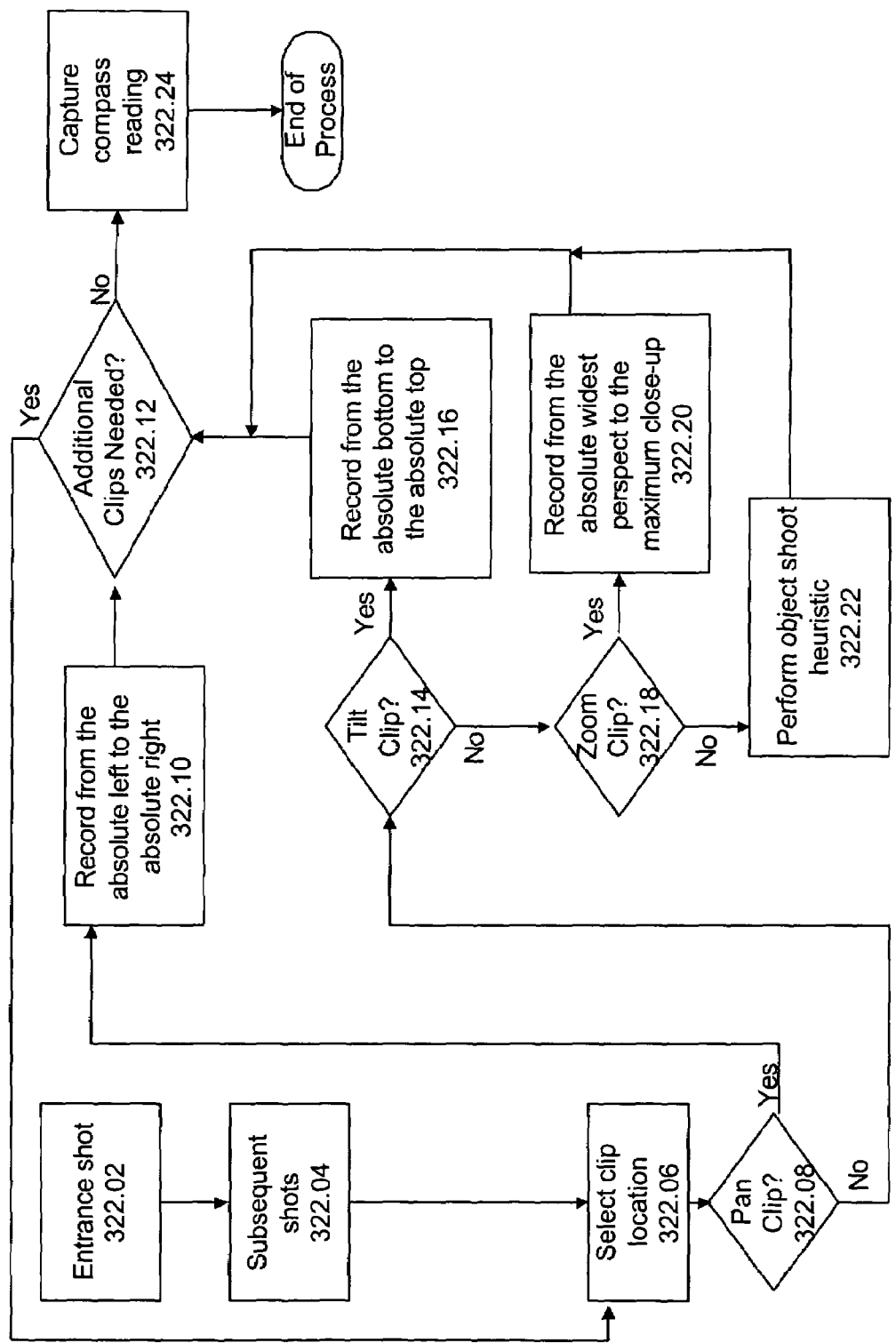
FIG. 14 is a flow chart illustrating an example of a shoot heuristic.

FIG. 14 is a flow chart illustrating a detailed example of the shoot heuristic at 322. At 322.02, the entrance shot is taken. In an interior representation 112 embodiment, the first clip 118 of a physical space is generally a pan shot from directly in front of the entry door. The aim is to accurately simulate the human experience of walking through the physical space to be represented.

At 322.04, subsequent viewpoints 114 are shot in a counter-clockwise rotation around the physical space to be represented. The various clip locations are identified and selected at 322.06.

a. Pan Clip

If the clip 118 at 322.08 is to be a pan clip 126, the camera person locks the tripod to pan mode only. Once the tripod has been positioned the camera person decides on either a standard pan angles which includes 90, 180, 270, and 360 degrees (as illustrated in FIGS. 5b, 5c, 5d, and 5e as discussed above) or a non-standard pan. Once the pan degrees are decided, a compass 164 reading is taken at the absolute left and absolute right of the pan such that the camera is facing the center of the physical space when the pan is at its middle position. The name of the shot, the type of pan used (number of degrees), and the compass readings from the absolute left, middle, and absolute right pan positions are written down. At 322.10, the camera person should preferably starts recording at the absolute left pan position of the shot and moves the camera from absolute left to absolute right, which in some cases can be a complete 360 degree pan.

b. Tilt Clip

If the clip 118 at 322.14 is to be a tilt clip 128, the camera person locks the tripod to tilt mode only at 322.16. Once the tripod has been positioned the camera person takes a compass 164 reading of the direction the camera is facing during the tilt and writes down the name of the shot and the compass reading. Next the camera is tilted to the absolute bottom then, while shooting, the camera is then tilted up to its absolute upwards facing position. This angle from absolute bottom to absolute top is between 0-360 degrees. The tilt clip 128 should be captured in such a way as to mimic the impression of person looking upwards.

C. Zoom Clip

If the clip 118 at 322.18 is a zoom clip 124, the camera person at 322.20 determines the end point of the zoom and centers camera accordingly, locking both the pan and tilt to ensure stability of the shot. The camera person then takes a compass reading of the direction the camera is facing and writes it down along with the name of the shot. Next the camera person records a zoom from as wide as possible and zooms into the selected spot.

Each of the recordings identified above should be taken at least twice to make sure that a usable shot "in the can." However, the compass 164 reading need only be taken once since it does not vary from one take of a shot to another. The video clips 118 discussed above relate to viewpoints 114. A different procedure can be followed with respect to object clips 146.

d. Object Clip

Figure 15:
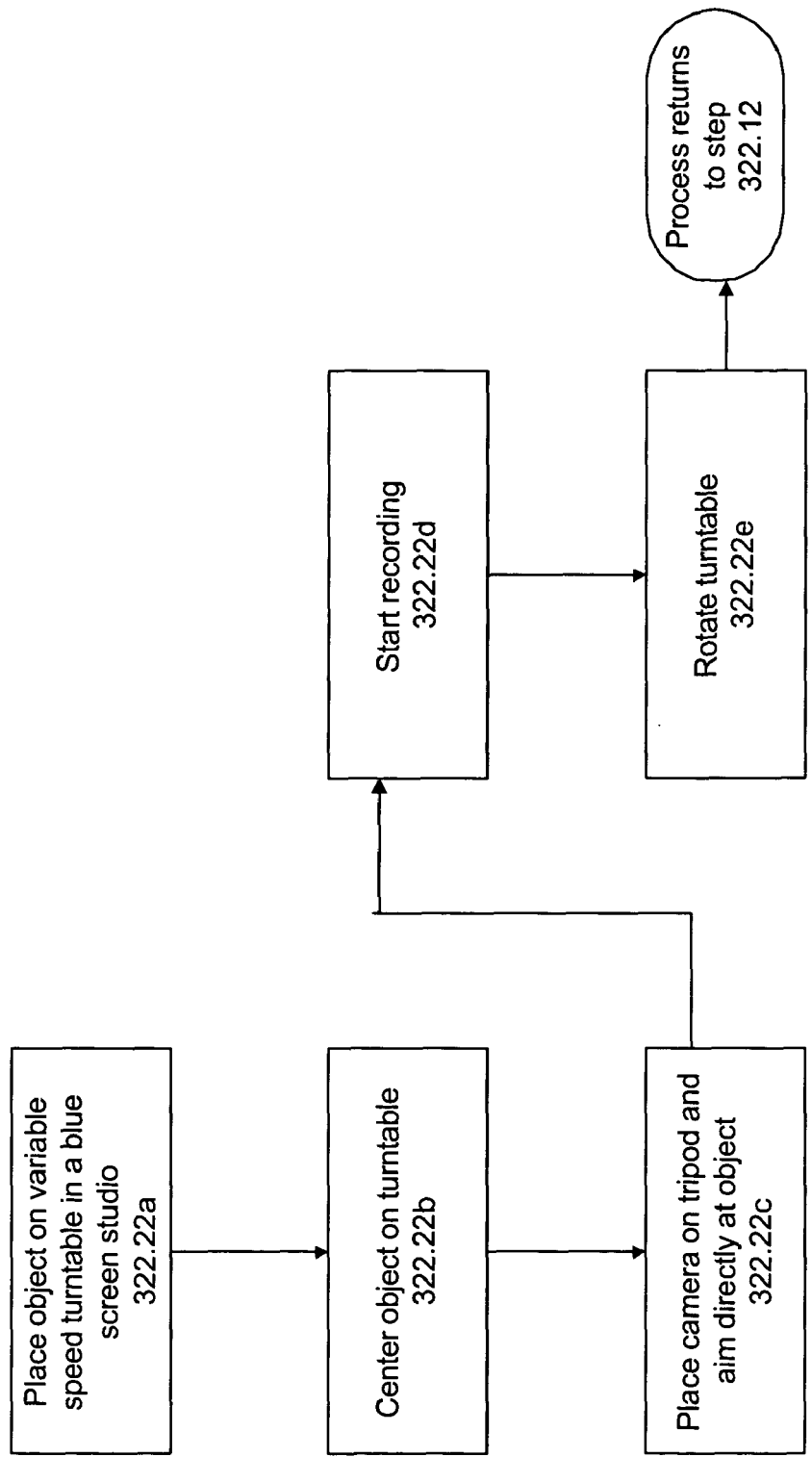
FIG. 15 is a flow chart illustrating an example of an object shoot heuristic.

A wide variety of different object shoot heuristics at 322.22 can be incorporated into the processing of the system 100. FIG. 15 is a flow chart illustrating an example of an object shoot heuristic that can be performed at 322.22.

At 322.22a, the object 116 can be placed on a variable speed turntable in a blue screen studio. At 322.22b, the object 116 can be centered on the turntable to accurately simulate the object's 116 center of gravity. At 322.22c, the camera can be placed on the tripod, and aimed directly at the object 116 at a variable angle (typically between −45 degrees to +45 degrees). At 322.22d, the camera person can start recording. The turntable is preferably turned on to a motion level of 2 (slow). The recording is stopped once a full 360 degree rotation has been completed. After all objects 116 in the representation area have been filmed, the process then returns to 322.13 of FIG. 14.

In a preferred embodiment, each viewpoint 112 is associated with a video clip 118. However, there are many instances where an object clip 144 may not be necessary. In some contexts (such as where the object 116 is a painting on a wall), a still image 150 will be desirable. In other contexts (such as an online virtual store), the object clip 146 might be a "commercial" relating to the object.

Returning to FIG. 14, a determination is made at 322.12 whether additional clips are needed. If additional clips 118 need to be taken, the process returns to the selection step at 322.06. Otherwise, a compass reading can be captured at 322.24. In some embodiments, the compass reading can be captured before the various video clips 118 are shot.

After all of the steps in FIG. 14 are performed, the process can then return to the process flow disclosed in FIG. 13.

3. Capture Heuristic

Figure 16:
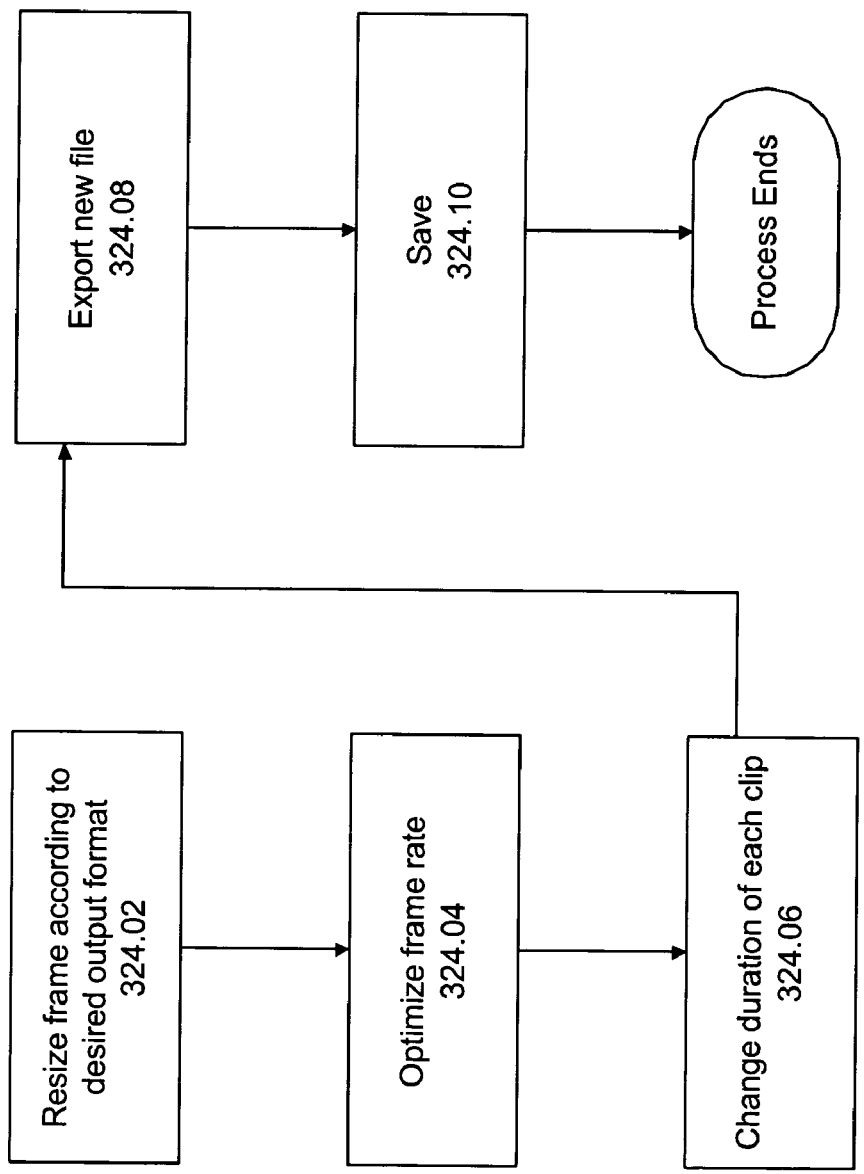
FIG. 16 is a flow chart illustrating an example of a capture heuristic.

A capture heuristic 324 can be performed at 324 after all of the video clips 118 have been taken. FIG. 16 is a flow chart illustrating an example of a capture heuristic that can be performed at 324. The capture heuristic at 324 can vary widely from embodiment to embodiment, so long as the end result is a video file consistent with the file format of the system 100. In a preferred embodiment, the video camera is connected to a computer that has a license copy of the ADOBE Premier application to capture the raw video data in a MiniDV format. Importing video via firewire compresses the resulting digital video file (preferably an avi file). In the capture heuristic 324 illustrated in FIG. 16, each step results in an incremental compression of the source video file size. By the end of the process, the resulting file is typically less than 1% of the initial size of the file. In almost all circumstances, the resulting file is no greater than 10% of the initial size of the file.

At 324.02, the frames are resized in accordance with the desired output format. In a typical embodiment, the desired output formats can be 360×240, 660×360, 720×480, or some other format known in the art.

At 324.04, the frame rate can be optimized. For example, the frame rate of the video file can be changed from the raw MiniDV (29.97 fps) footage according to the desired compression and playback usage. Different types of encoded video will involve different optimal settings. For example, relatively higher frame rates should be used for zoom shots, and relatively lower frame rates should be used for pans and tilts. The goal is to present the user 102 with a photo-realistic experience of the representation 112.

At 324.06, the duration of each video clip 118 can be changed. In a preferred embodiment, each clip 118 is time-compressed between a range of 50% to 25%. This maintains the photo-realistic nature of the user's experience, while supporting significant file compression.

A new file (an .avi file in a preferred embodiment) can then be exported at 324.08.

In a preferred embodiment, each outputted Microsoft Audio/Video (clip) file is saved at 324.10 in a folder named after the space captured in that clip. The files follow a naming convention for ease of use later on, that being: spaceName_p#.avi for pan shots, spaceName_t#.avi for tilt shots or spaceName_z#.avi for zoom shots, or spaceName_o#.avi for objects.

The process then returns to the process flow disclosed in FIG. 13.

4. Encode Heuristic

Figure 17:
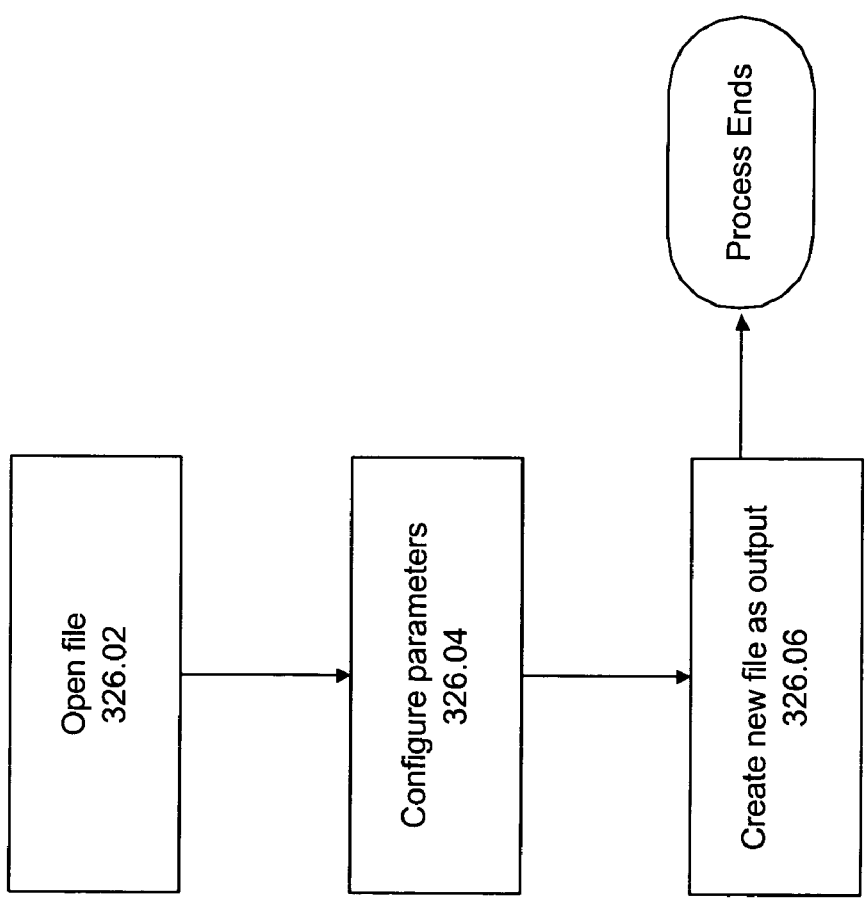
FIG. 17 is a flow chart illustrating an example of an encode heuristic.

Returning to FIG. 13, the process continues with the performance of an encode heuristic at 326. An example of the encode heuristic at 326 is disclosed in FIG. 17.

In the performance of the encode heuristic, each captured clip is converted into a shockwave flash format (a .swf file) through the use of a Flash Turbine software application. Different embodiments may utilize different software applications to generate end results of varying formats.

At 326.02, each captured video clip 118 is opened with the encoding application. Various configuration parameters are selected at 326.04. Such parameters can include video quality, JPEG quality, frame rate, frame size, smoothness, bit Rate limit, audio encoding, transient type, transient quality, collapse type, collapse quality, span type, span quality, span size, and image darken. The parameter selection process at 326.04 includes the selecting of the amount of time from the original file to encode.

The new file 110 can then be created as an output at 326.06. In some embodiments, the outputted file is in a format of a .swf file (the file format for the Shockwave Flash Player). Each outputted Shockwave Flash Player (player) file is saved in a folder named after the space captured in that clip. The files follow a naming convention of ease of use later on, that being: spaceName_p#.swf for pan shots, spaceName_t#.swf for tilt shots or spaceName_z#.swf for zoom shots, or spaceName_o#.swf for objects.

The process then returns to the process flow disclosed in FIG. 13.

5. Animate Heuristic

Figure 18:
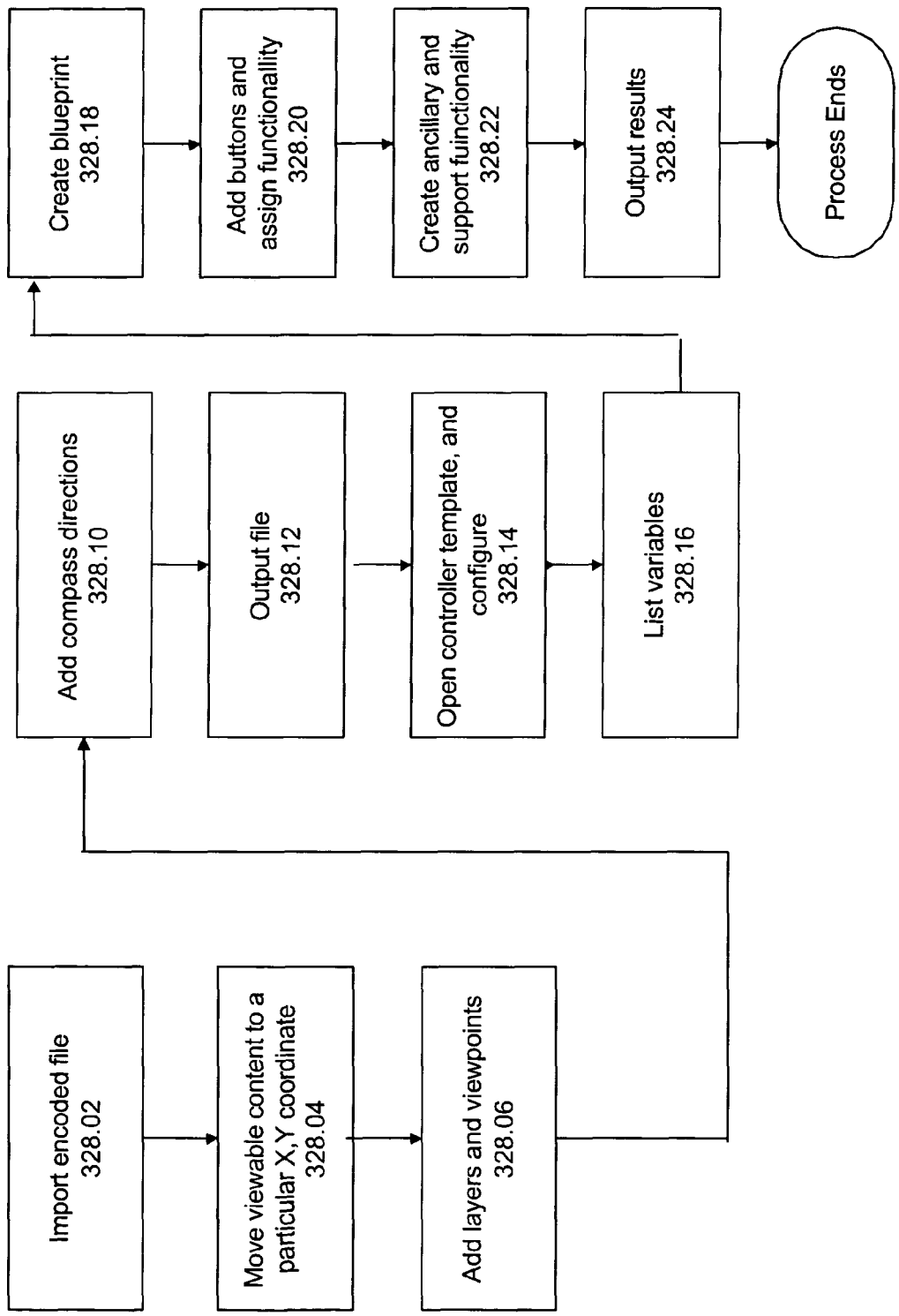
FIG. 18 is a flow chart illustrating an example of an animate heuristic.

After the performance of the encode heuristic at 326, an animate heuristic can be performed at 328. FIG. 18 is a flow chart illustrating an example of an animate heuristic. In the performance of the animate heuristic 326, each of the encoded Flash Player (*.swf) files are loaded into the Flash 5.0 application (by MACROMEDIA) or some other similar application tool providing a desirable authoring environment and the ability to position the viewable data for the controller which displays it to the user. The compass directions, as well as all hotspots (e.g. clickable areas in the representation 112) are also incorporated into each Flash-Player file. The animate heuristic is the process by which user interactivity is integrated into the file 110. FIG. 18 discloses one example of the processing that can be included in the animate heuristic.

At 328.02, the previous encoded file can be imported to the relevant application. In a preferred embodiment, the application is Flash 5.0 by MACROMEDIA.

At 328.04, viewable content is moved to a particular X,Y coordinate as represented in the map 212, discussed above. In the Flash 5.0 application, selecting "all keyframes" moves the viewable content to a particular (X,Y) numeric position based upon the controller.

At 328.08, layers and viewpoints 114 are added. In a Flash 5.0 application, two new layers and add hotspot buttons from a graphic template library to the relevant areas of the movie and add the action that will happen when the button is clicked.

At 328.10, compass directions are integrated into the encoded file 110. This allows users 102 to experience the correct orientation with respect to the display area 162 and the compass 164.

At 328.12, the output file is created. In a preferred embodiment, the outputted file is in the form of a single Flash Movie file. In a preferred embodiment, the file 110 is located in a folder named after the room in a folder called movies, and with the same naming convention used through the process, spaceName_p#.fla for example (a pan), note that now the file is a Flash Movie not a Flash Player file (.fla not .swf). The .swf files are deleted once they have been outputted as fla files.

After all encoded files have been animated with hotspots, compass directions, and position alignment, and saved as Flash Movies, each movie file can be exported back into Shockwave Flash Player format in a separate folder (outside the movies folder) of the same name as the space (Player files are saved with the same naming convention but (.swf) at the end, for example, spaceName_p#.swf). At 328.14, the controller template can be opened and configured.

Such a process includes setting a list of variables at 328.16. For each animated movie we set a list of variables at the beginning of the controller, these variables are: obj, mov_num, track_dir, pan_r_tog, tilt_z_tog, layer1._visible, layer2._visible, startup, the two or three movies to load (including the premovie which plays which the movie is loading), scroller._x, scroll._y.

A master template can then be opened for the desired controller, and customized pursuant to the steps described below.

At 328.18, the graphical representation of the blueprint 164 of the representation 112 is created. At 328.20, action buttons can be added from the graphics template library, assigning actions to correspond to each button. At 328.22, ancillary and support functionality is incorporated into the file 110. For example, the text for the "more information" button 168, the legend button 166, interactivity buttons 182 (including e-mail and other communications) are added at this stage in the process.

At 328.24, the results (the controller Movie) is then outputted as a file (a Shockwave Flash Player file in a preferred embodiment) into the folder of which matches the name of the representation area.

6. Additional Representation Areas

Returning to FIG. 13, the process flow from the blueprint heuristic at 320 through the animate heuristic at 328 is repeated for each representation area (subspace) in the representation 112.

For each subspace in a physical space (i.e. rooms in a house) each physical space contains X number of subspaces each of which has X number of different hotspots which can link to either a pan movie, tilt movie, zoom movie, object movie, webpage, or other scripted action (such as sending an email or interfacing with a database, or interfacing with an ecommerce system). At the end we have the following directories and files:

One main folder with the name of the application (say, "Demo).

In the Demo folder is at least two folders, one which is called "Movies" and one folder for each room in the Demo house which contains Shockwave Flash Player files.

In the Movies folder is one folder for each room in the Demo house containing Flash Movie files.

7. Template Customization

At 332, template customization is performed. A web template is picked and customized to contain the Shockwave Flash Player files, this web template file (and all necessary images) are placed in each of the room folders, but not inside the Movies folder.

8. Configure Access Mechanism

The file 110 including the representation 112 is ready to run after the access mechanism is configured at 334. In a preferred embodiment, each subspace (e.g. representation area) folder contains all necessary files to display on any browser. The subspace folders can be loaded onto a CD-ROM for browsing locally, or the folders can be uploaded to a web server or other network configuration for viewing online.

Should changes need be made on any file 110, each of the processes above can be repeated so that the desired change is incorporated into the file 110. At any point, implementers of the system 100 can return and reassign actions, buttons, graphics, or text. In a preferred embodiment, the coding of all button actions refer an external database. In an e-commerce application, Storeowners could always maintain their graphical interface and keep changing the items that are in the database to allow for a scalable system.

VII. Alternative Embodiments

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in image alignment systems and methods, and that the invention will be incorporated into such future embodiments.

The invention claimed is:

1. An interactive video system comprising:
   a representation of physical space, said representation comprising:
      a first viewpoint, said first viewpoint including:
         a first video clip;
         a plurality of views, including a first view and a second view;
      a navigation tool, said navigation tool providing for a first transition from said first view to said second view, wherein said first transition is said first video clip; and
      a file storing said representation, wherein said file is less than 1% of the size of an initial .avi file used to create said file.

2. An interactive video system comprising:
   a representation of physical space, said representation comprising:
      a first viewpoint, said first viewpoint including:
         a first video clip;
         a plurality of views, including a first view and a second view;
      a navigation tool, said navigation tool providing for a first transition from said first view to said second view, wherein said first transition is said first video clip;
      a configuration heuristic;
      a frame rate;
      a bit rate; and
      a compression factor, wherein said configuration heuristic is invoked to automatically determine said frame rate, said bit rate, and said compression factor, and wherein said representation is stored in accordance with said frame rate, said bit rate, and said compression factor.

3. An interactive video system, comprising:
   a display subsystem, including:
      a plurality of views, comprising a first view, a zoom view, a tilt view, and a pan view;
      a plurality of video clips, comprising a pan clip, a zoom clip, and a tilt clip, and an object clip;
      a plurality of viewpoints, each said viewpoint comprising a subset of said plurality of views, a subset of said plurality of video clips, a viewpoint location and a viewpoint icon;
   a photo-realistic object, said object comprising said object clip, an object location and an object icon;
   a photo-realistic representation of physical space, said representation comprising said plurality of viewpoints and said object, wherein said object icon identifies said object location, and wherein said viewpoint icons identify said viewpoints locations for said viewpoints;
   a blueprint, wherein said blueprint is a two-dimensional cross-sectional view of said representation, wherein said blueprint includes said viewpoint icon and said object icon; and
   a compass, comprising a direction of a current view, wherein said compass indicates said current direction of said current view; and
   a navigation subsystem, including:
   a zoom tool, wherein said zoom tool provides for the navigation from said first view to said zoom view using said zoom clip;
   a tilt tool, wherein said title tool provides for the navigation from said first view to said tilt view using said tilt clip; and
   a pan tool, wherein said pan tool provides for the navigation from said first view to said tilt view using said pan clip.

* * * * *